United States Patent
Lu

(10) Patent No.: US 10,810,700 B2
(45) Date of Patent: Oct. 20, 2020

(54) METHOD OF ADJUSTING TEXTURE COORDINATES BASED ON CONTROL REGIONS IN A PANORAMIC IMAGE

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/292,979

(22) Filed: Mar. 5, 2019

(65) Prior Publication Data

US 2020/0286206 A1    Sep. 10, 2020

(51) Int. Cl.
G06T 3/20 (2006.01)
G06T 3/00 (2006.01)
H04N 5/232 (2006.01)
G06T 3/40 (2006.01)

(52) U.S. Cl.
CPC ............ G06T 3/20 (2013.01); G06T 3/0012 (2013.01); G06T 3/0093 (2013.01); G06T 3/4038 (2013.01); H04N 5/23238 (2013.01)

(58) Field of Classification Search
CPC . G06T 15/04; G06T 11/60; G06T 7/40; G06T 7/60; G06T 3/20; G06T 15/06; G06T 15/10; G06T 13/344; G06T 19/003; G06T 3/002; H04N 5/23293; H04N 5/247; H04N 5/23238; H04N 2013/0088
See application file for complete search history.

(56) References Cited

U.S. PATENT DOCUMENTS

| 6,097,854 | A | * | 8/2000 | Szeliski | G06K 9/209 345/634 |
| 10,104,288 | B2 | | 10/2018 | Hung et al. | |
| 10,186,067 | B2 | | 1/2019 | Lu et al. | |
| 2002/0122113 | A1 | * | 9/2002 | Foote | G06T 3/4038 348/48 |

(Continued)

FOREIGN PATENT DOCUMENTS

| CN | 101951487 A | | 1/2011 | |
| EP | 0850462 A2 | * | 7/1998 | ............. G06T 15/04 |

(Continued)

Primary Examiner — Dramos Kalapodas
(74) Attorney, Agent, or Firm — Muncy, Geissler, Olds & Lowe, P.C.

(57) ABSTRACT

A method of adjusting texture coordinates based on control regions in a panoramic image is disclosed. The method comprises determining warping coefficients of a plurality of control regions in a panoramic image; retrieving two selected warping coefficients out of the warping coefficients for each of a plurality of camera images with respect to each vertex from a first vertex list according to two coefficient indices for each camera image in its data structure; calculating an interpolated warping coefficient for each camera image with respect to each vertex according to the two selected warping coefficients and a coefficient blending weight for each camera image in its data structure; and, calculating modified texture coordinates in each camera image for each vertex according to the interpolated warping coefficient and original texture coordinates for each camera image in its data structure to form a second vertex list.

10 Claims, 18 Drawing Sheets

(56) References Cited

U.S. PATENT DOCUMENTS

| | | | |
|---|---|---|---|
| 2003/0133020 A1* | 7/2003 | Suh | G06T 7/30 |
| | | | 348/218.1 |
| 2005/0206659 A1* | 9/2005 | Cutler | H04N 5/23238 |
| | | | 345/660 |
| 2008/0144968 A1* | 6/2008 | Cohen | G06T 3/0018 |
| | | | 382/276 |
| 2014/0111605 A1* | 4/2014 | Guo | G06T 3/4038 |
| | | | 348/36 |
| 2015/0364157 A1 | 12/2015 | Hayashi | |
| 2018/0018807 A1 | 1/2018 | Lu et al. | |
| 2018/0357804 A1* | 12/2018 | Forutanpour | H04N 5/247 |
| 2019/0220952 A1* | 7/2019 | Lee | G06T 3/4038 |
| 2020/0074716 A1* | 3/2020 | Kaplan | G06T 15/10 |

FOREIGN PATENT DOCUMENTS

| | | |
|---|---|---|
| TW | 201416792 A | 5/2014 |
| TW | 201632982 A | 9/2016 |

\* cited by examiner

METHOD OF ADJUSTING TEXTURE COORDINATES BASED ON CONTROL REGIONS IN A PANORAMIC IMAGE

BACKGROUND OF THE INVENTION

Field of the Invention

The invention relates to panoramic imaging, and more particularly, to a method of adjusting texture coordinates based on control regions in a panoramic image. The invention facilitates generation of panoramic images in image processing system.

Description of the Related Art 360-degree panoramic images, also known as 360-degree panoramic images, full panoramic images, or spherical images, are video recordings of a real-world panorama, where the view in every direction is recorded at the same time, shot using an omnidirectional camera or a collection of cameras. A 360-degree panoramic image covers 360 degree field of view (FOV) horizontally and 180 degree vertically.

An equirectangular video is a commonly projection used in 360-degree video. A common example of equirectangular projection is a standard world map, which maps the surface of the world (a sphere) onto orthogonal coordinates. That is, equirectangular projection maps the latitude and longitude coordinates of a spherical globe directly onto horizontal and vertical coordinates of a grid. Image distortion is minimal at the equator, and infinite at the poles. The poles (Zenith, Nadir) are located at the top and bottom edge and are stretched to the entire width of the image.

FIG. 1 is a diagram showing a conventional panoramic image processing system disclosed in U.S. Pat. No. 10,104, 288 B2 (the disclosure of which is incorporated herein by reference in its entirety). Referring to FIG. 1, the panoramic image processing system 10 includes an image capture module 11, a compensation device 100, an image encoding module 12, and a correspondence generator 15. The compensation device 100 includes a vertex processing device 110, an optimize unit 150, a primitive assemble unit 120 and an image processing apparatus 130.

The image capture module 11 including a plurality of cameras is capable of capturing a view with 360-degree horizontal FOV and 180-degree vertical FOV to generate a plurality of camera images. For example, as shown in FIG. 2A, the image capture module 11 includes six cameras (not shown) respectively mounted on the six faces of a cube framework 21 to simultaneously capture a view of the world with 360-degree horizontal FOV and 180-degree vertical FOV to generate six camera images. In order to store and display conveniently on computer screens, a spherical projection is mapped to an equirectangular panoramic image. Its aspect ratio is chosen to be 2:1, with the horizontal coordinate representing the azimuth angle $\theta \in 0°\sim360°$, and the vertical coordinate representing the elevation angle $\varphi \in -90°\sim90°$. FIG. 2B shows an equirectangular panoramic image derived from an equirectangular projection of the six camera images from the six cameras of the image capture module 11 in FIG. 2A. Referring to FIG. 2B, pixels in regions 26 are overlapping by three camera images and pixels in regions 24-25 are overlapping by two camera images while pixels in regions 26 comes from a single camera image. Thus, the image processing apparatus 130 needs to perform blending operations over the overlap regions for stitching the six camera images.

The processing pipeline for the panoramic image processing system 10 is divided into an offline phase and an online phase. In the offline phase, the six cameras are calibrated separately. The correspondence generator 15 adopts appropriate image registration techniques to generate an original vertex list, and each vertex in the original vertex list provides the mapping between the equirectangular panoramic image and camera images (or between the equirectangular coordinates and the texture coordinates). For example, the sphere 22 with 2 meter radius (r=2) is drawn in many circles as latitude and longitude, whose intersection points are treated as calibration points. The six cameras capture these calibration points, and their positions on camera images are known. Then the mapping relationship between the equirectangular panoramic image and camera images are constructed since the view angles of the calibration points and camera coordinates are linked. A calibration point with the mapping relationship is defined as a "vertex" in this invention. In brief, the correspondence generator 15 conducts calibration between the camera images and the equirectangular panoramic image for the vertices to obtain the original vertex list. The correspondence generator 15 completes all necessary computations in the offline phase.

FIG. 2C shows a triangle mesh modeling a surface of the sphere 22. FIG. 2D shows a polygon mesh composing/modeling the equirectangular panoramic image. The polygon mesh of FIG. 2D is produced by performing an equirectangular projection of the triangle mesh of FIG. 2C. The polygon mesh in FIG. 2D is a collection of quadrilaterals/triangles. Please note that only the top row and the bottom row of the polygon mesh in FIG. 2D are formed by quadrilaterals because they are projected from pole triangles of the triangle mesh in FIG. 2C. The term "pole triangle" refers to a triangle with a vertex being a pole point (Zenith, Nadir) in the triangle mesh modeling the surface of the sphere 22 as shown in FIG. 2C.

According to the geometry of the equirectangular panoramic image and camera images, the correspondence generator 15 computes equirectangular coordinates and texture coordinates for each vertex in the polygon mesh and determines whether the vertex is a pole point (Zenith, Nadir) to generate an original vertex list. Afterward, the correspondence generator 15 supplies the original vertex list to the vertex processing device 110. The original vertex list is a list of a plurality of vertices forming a plurality of quadrilaterals of the polygon mesh (FIG. 2D) and each vertex is defined by its corresponding data structure. The data structure defines a vertex mapping between a destination space and a texture space (or between the equirectangular coordinates and the texture coordinates). Table 1 shows an exemplary data structure of each vertex in the original vertex list.

TABLE 1

| Attributes | Descriptions |
|---|---|
| (x, y) | Equirectangular coordinates |
| N | Number of covering/overlapping camera images |
| Pole flag | Indicate whether the vertex is a pole point(e.g., 1: pole point; 0: not pole point) |
| $ID_1$ | ID of first camera image |
| $(u_1, v_1)$ | Texture coordinates in first camera image |
| $w_1$ | Blending weight for first camera image |
| ... | ... |
| $ID_N$ | ID of $N^{th}$ camera image |
| $(u_N, v_N)$ | Texture coordinates in $N^{th}$ camera image |
| $w_N$ | Blending weight for $N^{th}$ camera image |

In an ideal case, the six cameras (including camera #1 and camera #2) simultaneously located at the system center 32 of the cube framework 21, so a single ideal imaging point 33 derived from a far object 35 is located on an image plane 22 with 2 meter radius (r=2) as shown in the left portion of FIG. 3A. Thus, referring to the right portion of FIG. 3A, since the ideal imaging position 33 in the camera image #1 (from camera #1) matches the ideal image position 33 in the camera image #2 (from camera #2), a perfect stitching/blending result is shown in the equirectangular panoramic image after an image stitching/blending process is completed by the image processing apparatus 130. However, in real cases, the real focal points (or camera centers) 36 and 37 for camera #1 and camera #2 are separated from the optimal focal point (or system center) 32 so that two real imaging positions 38 derived from a far object 35 are separately located on the image plane 22 as shown in the left portion of FIG. 3B. Consequently, referring to the right portion of FIG. 3B, a mismatch image defect is clearly shown in the equirectangular panoramic image. The compensation device 100 is used to lessen the mismatch image defect caused by shifted camera centers 36/37 of the image capture module 11.

In the example of FIG. 4, there are twelve overlap regions R(1)~R(12) in the equirectangular panoramic image, and thus the overlap regions R(1)~R(12) respectively have warping coefficients C(1)~C(12). The vertex processing device 110 receives the original vertex list and warping coefficients C(1)~C(12) for each of overlap regions R(1)~R(12) in the equirectangular panoramic image, modifies all the texture coordinates of all camera images for each vertex from the original vertex list on a vertex-by-vertex basis and generates an adjusted vertex list. For example, the original texture coordinates (u1, v1) of a target vertex P1 is changed to the modified texture coordinates (u1', v1') in the front-face camera by the vertex processing device 110. The primitive assemble unit 120 receives the adjusted vertex list and generates an assembled vertex list. According to the assembled vertex list, the image processing apparatus 130 simply regards the subsequent camera images from the image capture module 11 as textures, maps them onto the polygon mesh and stitches them together to form the equirectangular panoramic image in real time. Besides, the image processing apparatus 130 measures region errors E(1)~E(12) for overlap regions R(1)~R(12) in the equirectangular panoramic image, and outputs the region errors E(1)~E(12).

FIG. 5 is a flow chart showing operations of the optimize unit 150 using Hill-climbing search technique disclosed in U.S. Pat. No. 10,104,288 B2.

For ease of description, the step S504 is denoted by E(n)=func(C(n)), for n=1, 2, . . . , 12, and func( )denotes the combinational operations of the vertex processing device 110, the primitive assemble unit 120 and the image processing apparatus 130. In FIG. 5, R1 denotes the number of iterations/loops (including steps S510~S518), Cp(n) denotes a previous warping coefficient, Ep(n) denotes a previous region error, C(n) denotes a current warping coefficient, E(n) denotes a current region error, T(n) denotes the amount that is used to modify C(n), and Std denotes a step decrease equal to 0.95, for n=1, 2, . . . , 12. The method of FIG. 5 is used to find minimum region errors E(1)~E(12) and determine their corresponding current warping coefficients C(1)~C(12) for rendering an equirectangular panoramic image within a M1 number of loops.

However, in the loop of steps S510~S518 in FIG. 5, the current warping coefficient C(n) for each overlap region R(n) changes independently and the amount (i.e., T(n)) by which each current warping coefficient C(n) is changed at a time is tiny, for n=1, 2, . . . , 12. Thus, it is easy for the method of FIG. 5 to be trapped in local minimums of E(1)~E(12), especially in the local minimums around the default values of E(1)~E(12) that are set in step S502. In addition, if there are ten different current warping coefficients for each overlap region, there would be $10^{12}$ combinations of warping coefficients in total for the twelve overlap regions and thus enormous data volume needs to be measured. The method of FIG. 5 doesn't guarantee that an optimal result would be achieved within a predefined number of loops. In other words, the time that the current warping coefficients C(1)~C(12) converge is indefinite.

What is needed is a stitching method for generating panoramic images used in a 360-degree camera system to minimize the mismatch image defect mismatch image defect within a predefined number of loops and provide best image quality for panoramic images. What is further needed is a method of adjusting texture coordinates based on control regions in a panoramic image, which facilitates generation of panoramic images.

SUMMARY OF THE INVENTION

In view of the above-mentioned problems, an object of the invention is to provide a method of adjusting texture coordinates based on control regions in a panoramic image, which facilitates generation of panoramic images, minimizes the mismatch image defect caused by shifted camera centers of an image capture module and provides best image quality for panoramic images.

One embodiment of the invention provides a method applied in an image processing system having an image capture module that captures a 360-degree horizontal field of view and 180-degree vertical field of view to generate a plurality of camera images. The method comprises determining warping coefficients of a plurality of control regions in a panoramic image; retrieving two selected warping coefficients out of the warping coefficients for each of a plurality of camera images with respect to each vertex from a first vertex list according to two coefficient indices for each camera image in its data structure; calculating an interpolated warping coefficient for each camera image with respect to each vertex according to the two selected warping coefficients and a coefficient blending weight for each camera image in its data structure; and, calculating modified texture coordinates in each camera image for each vertex according to the interpolated warping coefficient and original texture coordinates for each camera image in its data structure to form a second vertex list. Each of the first vertex list and the second vertex list comprises a plurality of vertices with their data structures that define a vertex mapping between the camera images and the panoramic image. The coefficient blending weight for each camera image for each vertex is related to a first angle associated with a location of a starting control region and its original texture coordinates in each camera image. The warping coefficients respectively denote warping degrees for the control regions comprising a plurality of edge control regions and a plurality of corner control regions.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
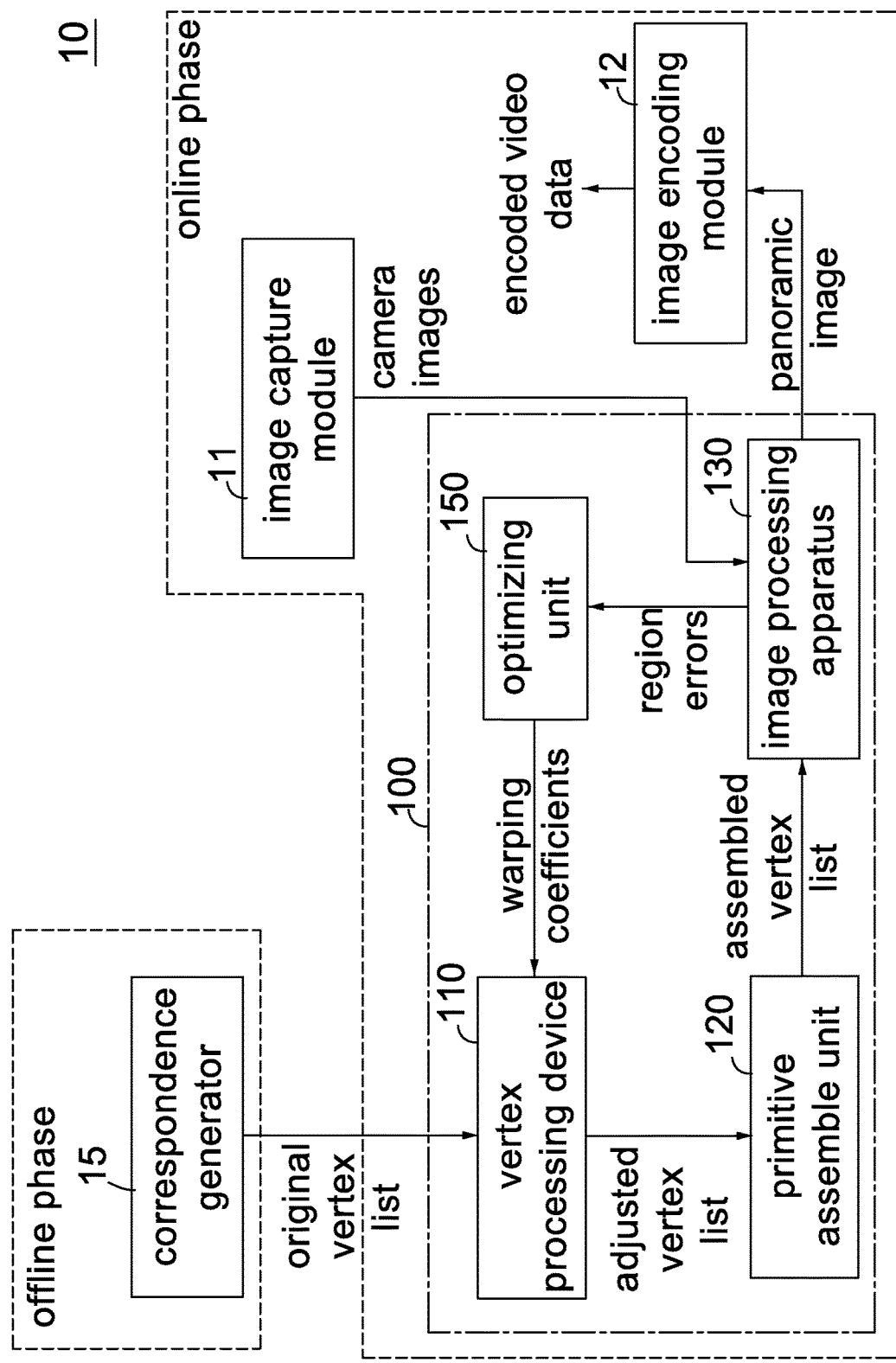
FIG. 1 is a diagram showing a conventional panoramic image processing system disclosed in U.S. Pat. No. 10,104,288 B2.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components and/or components with the same function are designated with the same reference numerals.

A feature of the invention is to minimize the mismatch image defect within a predefined number of loops. The predefined number of loops are associated with an offset ofs that a camera center (or its real focal point) 36 is separated from the system center (or the optimal focal point) 32 (see FIG. 3B). Another feature of the invention is to define edge control regions and corner control regions (of FIG. 7B) among the overlap regions (of FIG. 4) in an equirectangular panoramic image. Another feature of the invention is to determine an optimal warping coefficient/degree of a selected control region according to region errors and warping coefficient differences among the selected control region and its adjacent control regions of a decision group. Another feature of the invention is to maintain the warping coefficient/degree consistency in a selected control region and its adjacent control regions of the decision group. Another feature of the invention is that the data structure of each vertex in a source vertex list (Table 2) provided by the correspondence generator 65 additionally includes two fields (i.e., warping coefficient indices ($idx_{i0}$, $idx_{i1}$) and a blending weight for warping coefficients ($Alpha_i$)) for each camera image in comparison with the data structure of each vertex in the original vertex list (Table 1).

Figure 2B:
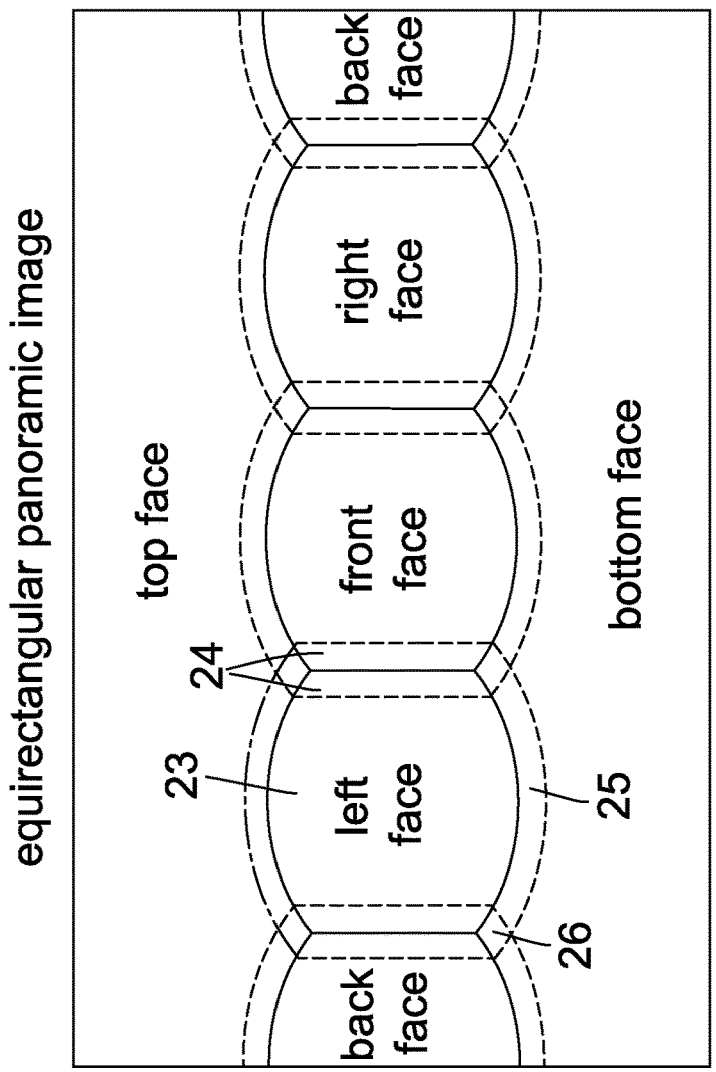
FIG. 2B shows an equirectangular panoramic image derived from an equirectangular projection of six-face camera images (top, bottom, right, left, front, back) from the image capture module 11.
Figure 2A:
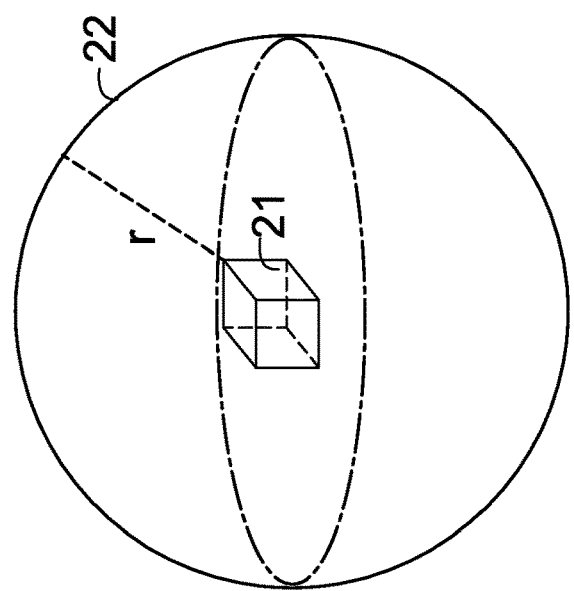
FIG. 2A shows a relation between a cube framework and a sphere.
Figure 6A:
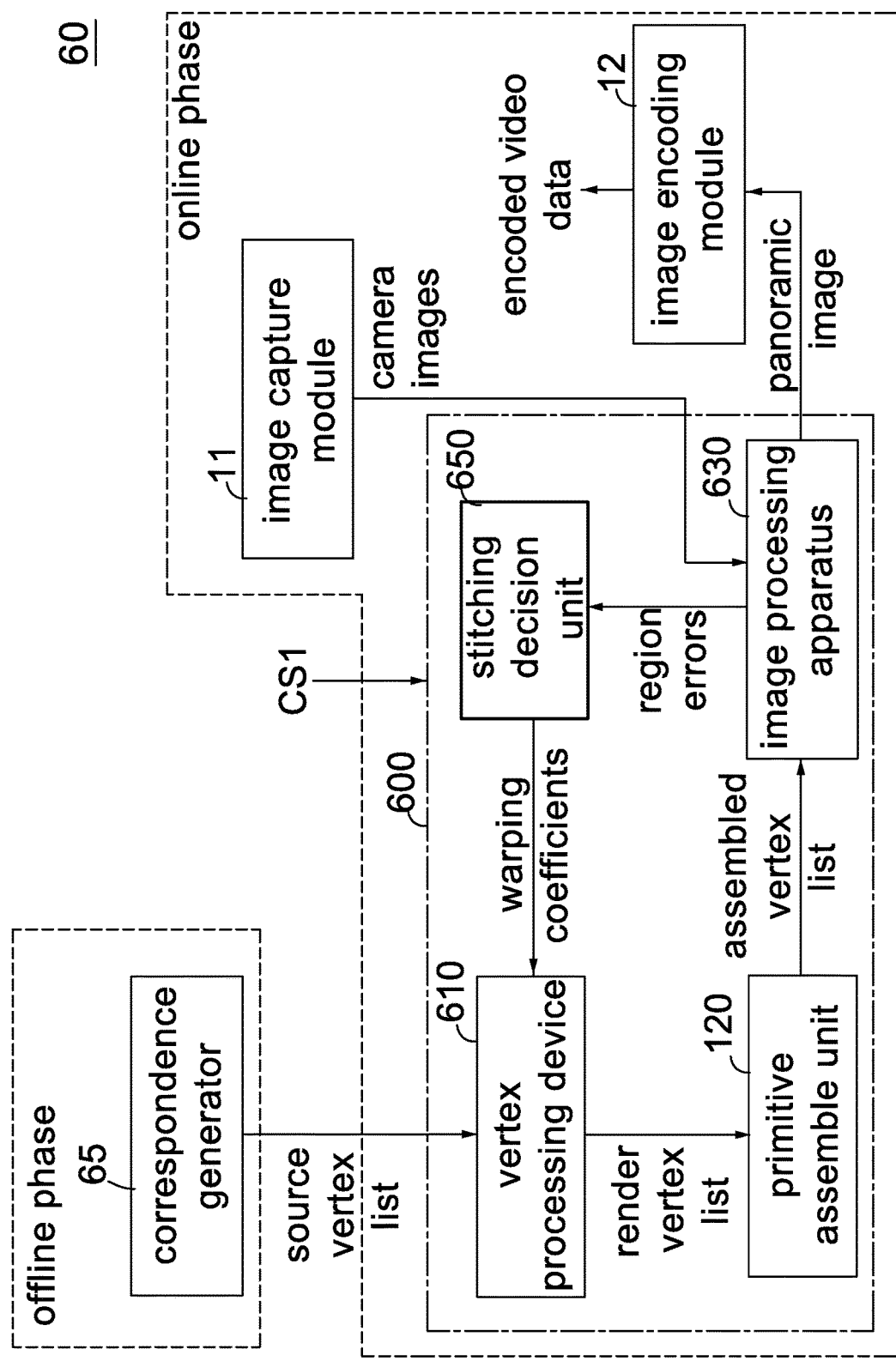
FIG. 6A is a diagram showing a panoramic image processing system according to the invention.

FIG. 6A is a diagram showing a panoramic image processing system according to the invention. Comparing FIGS. 1 and 6A, the correspondence generator 15 and the compensation device 100 are respectively replaced with a correspondence generator 65 and a compensation device 600. The correspondence generator 65 supplies a source vertex list to the vertex processing device 610. The image capture module 11 is capable of capturing a view with 360 degree horizontal FOV and 180 degree vertical FOV to generate a plurality of camera images. After receiving the camera images from the image capture module 11, according to an assembled vertex list, the image processing apparatus 630 performs rasterization, texture mapping and blending operations to form a panoramic image in a rendering mode and also generates region errors for control regions in a measure mode (will be described later). Then, the image encoding module 12 encodes the panoramic image and transmits the encoded video data. Examples of the panoramic image include, without limitation, a 360 degree panoramic image and an equirectangular panoramic image. For purposes of clarity and ease of description, hereinafter, the following examples and embodiments will be described with the equirectangular panoramic image and with the assumption that the image capture module 11 includes the six cameras respectively mounted on the six faces of the cube framework 21 as shown in FIG. 2A and generates six camera images (top, bottom, right, left, front, back).

The source vertex list is a list of a plurality of vertices forming a plurality of quadrilaterals of the polygon mesh (FIG. 2D) and each vertex is defined by its corresponding data structure. Table 2 shows an exemplary data structure of each vertex in the source vertex list.

TABLE 2

| Attributes | Descriptions |
| --- | --- |
| (x, y) | Equirectangular coordinates |
| N | Number of covering/overlapping camera images |
| Pole flag | Indicate whether the vertex is a pole point(e.g., 1: pole point; 0: not pole point) |
| $ID_1$ | ID of first camera image |
| $(u_1, v_1)$ | Texture coordinates in first camera image |
| $w_1$ | Blending weight for stitching in first camera image |
| $(idx_{10}, idx_{11})$ | Warping coefficient indices in first camera image |
| $Alpha_1$ | Blending weight for warping coefficients in first camera image |
| ... | ... |
| $ID_N$ | ID of $N^{th}$ camera image |
| $(u_N, v_N)$ | Texture coordinates in $N^{th}$ camera image |
| $w_N$ | Blending weight for stitching in $N^{th}$ camera image |
| $(idx_{N0}, idx_{N1})$ | Warping coefficient indices in $N^{th}$ camera image |
| $Alpha_N$ | Blending weight for warping coefficients in $N^{th}$ camera image |

As shown above, the data structure of each vertex in the source vertex list is similar to the data structure of each vertex in the original vertex list (Table 1) except that the data structure of each vertex in the source vertex list additionally includes two fields (i.e., warping coefficient indices ($idx_{i0}$, $idx_{i1}$) and a blending weight for warping coefficients ($Alpha_i$)) for each camera image, where i=1~N.

The compensation device 600 includes a vertex processing device 610, a stitching decision unit 650, a primitive assemble unit 120 and an image processing apparatus 630. The vertex processing device 610 receives the source vertex list and warping coefficients for control regions in the equirectangular panoramic image, modifies all the texture coordinates of all camera images for each vertex from the source vertex list on a vertex-by-vertex basis and generates a render vertex list (will be described below). The primitive assemble unit 120 receives the render vertex list and generates an assembled vertex list. In brief, the primitive assembly unit 120 outputs a group of three primitive vertices with their data structures as a part of the assembled vertex list if no pole point is included, and outputs a group of four primitive vertices with their data structures as a part of the assembled vertex list if a pole point is included. The detailed operations of the primitive assembly unit 120A are disclosed in U.S. Pat. No. 10,104,288 B2. According to the assembled vertex list, the image processing apparatus 630 simply regards the subsequent camera images from the image capture module 11 as textures, maps them onto the polygon mesh and stitches them together to form the equirectangular panoramic image in real time in a rendering mode. Besides, according to the assembled vertex list, the image processing apparatus 630 measures region errors of all control regions in the equirectangular panoramic image, and outputs the region errors in a measure mode. Then, the stitching decision unit 650 receives the region errors and generates the corresponding warping coefficients in the measure mode. On the other hand, in the rendering mode, the stitching decision unit 650 is disabled; thus, the vertex processing device 610, the primitive assemble unit 120 and the image processing apparatus operates to generate equirectangular panoramic images based on the optimal warping coefficients of all control regions outputted from the stitching decision unit 650.

Figure 7A:
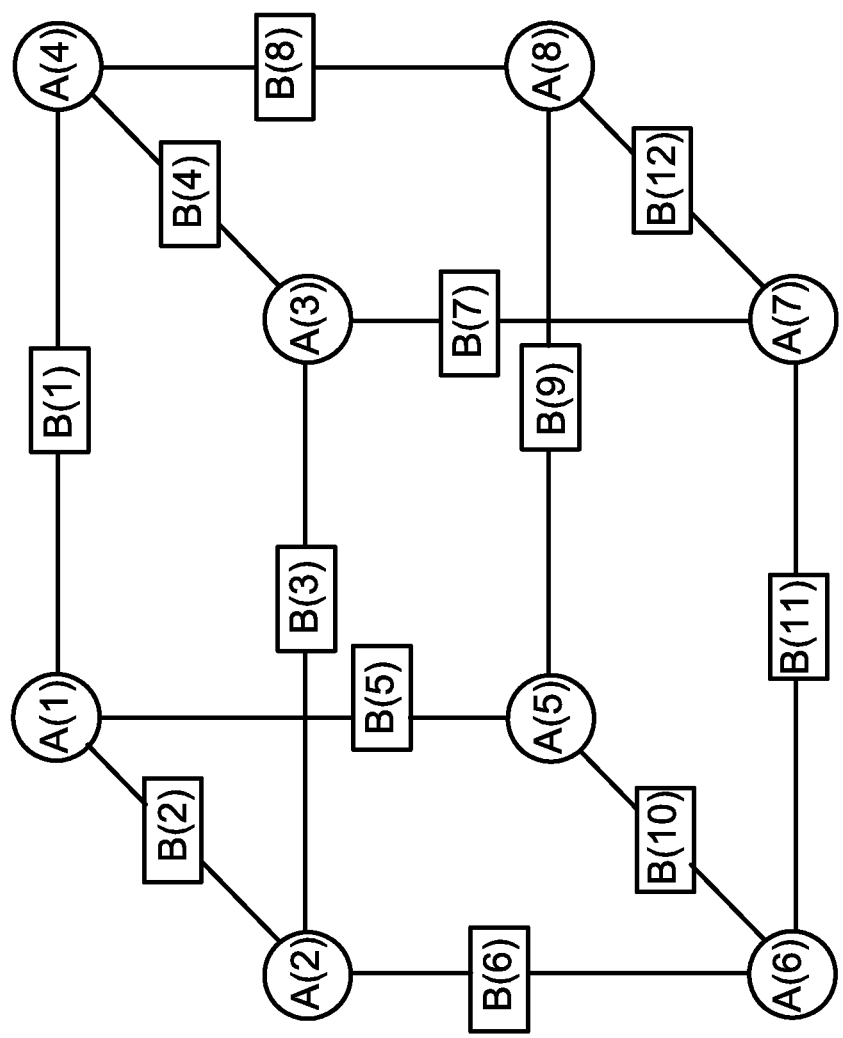
FIG. 7A shows an exemplary cube corresponding to the equirectangular panoramic image in FIG. 7B and having twenty control regions.
Figure 7B:
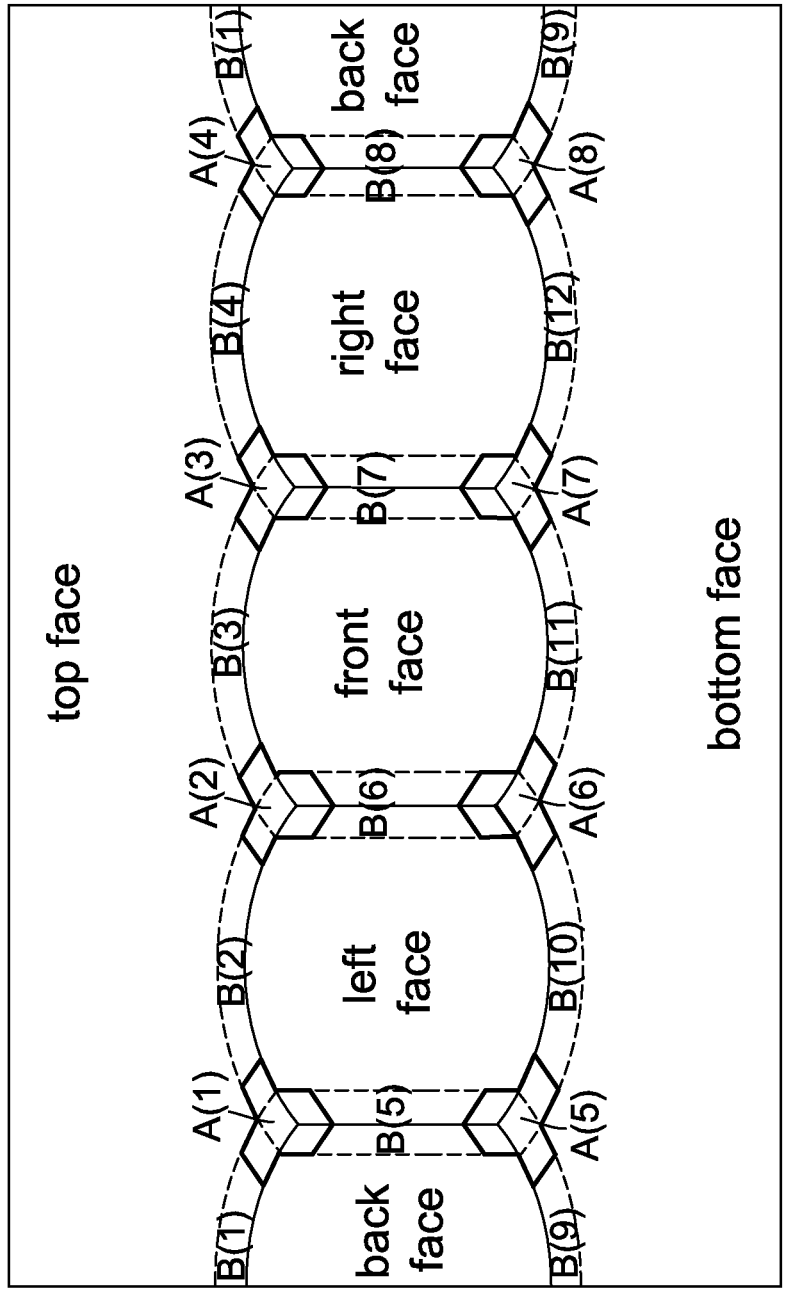
FIG. 7B shows an exemplary equirectangular panoramic image with twenty control regions.

FIG. 7A shows an exemplary cube corresponding to the equirectangular panoramic image in FIG. 7B and having twenty control regions. FIG. 7B shows an exemplary equirectangular panoramic image with twenty control regions. Referring to FIGS. 7A and 7B, the equirectangular panoramic image has twenty control regions, i.e., eight corner control regions A(1)~A(8) and twelve edge control regions B(1)~B(12). In comparison with FIG. 4, the twelve overlap regions R(1)~R(12) are divided into the twenty control regions A(1)~A(8) and B(1)~B(12). In an embodiment, each edge of the cube in FIG. 7A is divided into an edge control region and its two adjacent corner control regions with a length ratio of 3:1:1. For example, the edge of the cube in FIG. 7A including B(3) has a length ratio of 1:3:1 among A(2), B(3) and A(3). Each of eight corner control regions has three adjacent edge control regions and each of twelve edge control regions has two adjacent corner control regions. In an alternative embodiment, each edge of the cube in FIG. 7A is divided into an edge control region and its two adjacent corner control regions with a length ratio of 2:1:1. Please note that the twenty control regions and the length ratio are provided by way of example and not limitations of the invention. In the actual implementations, any other number of control regions and any other length ratio can be used. Please note that the total number of control regions in the invention must be greater than the number of the overlap regions in FIG. 4.

For purposes of clarity and ease of description, hereinafter, Reg(1) denotes the corner control region A(1), Reg(2) denotes the corner control region A(2), . . . , and Reg(8) denotes the corner control region A(8). Further, Reg(9) denotes the edge control region B(1), Reg(10) denotes the edge control region B(2), . . . , and Reg(20) denotes the edge control region B(12). Besides, the following examples and embodiments will be described with the twenty control regions Reg(1)~Reg(20) in the equirectangular panoramic image.

Figure 6B:
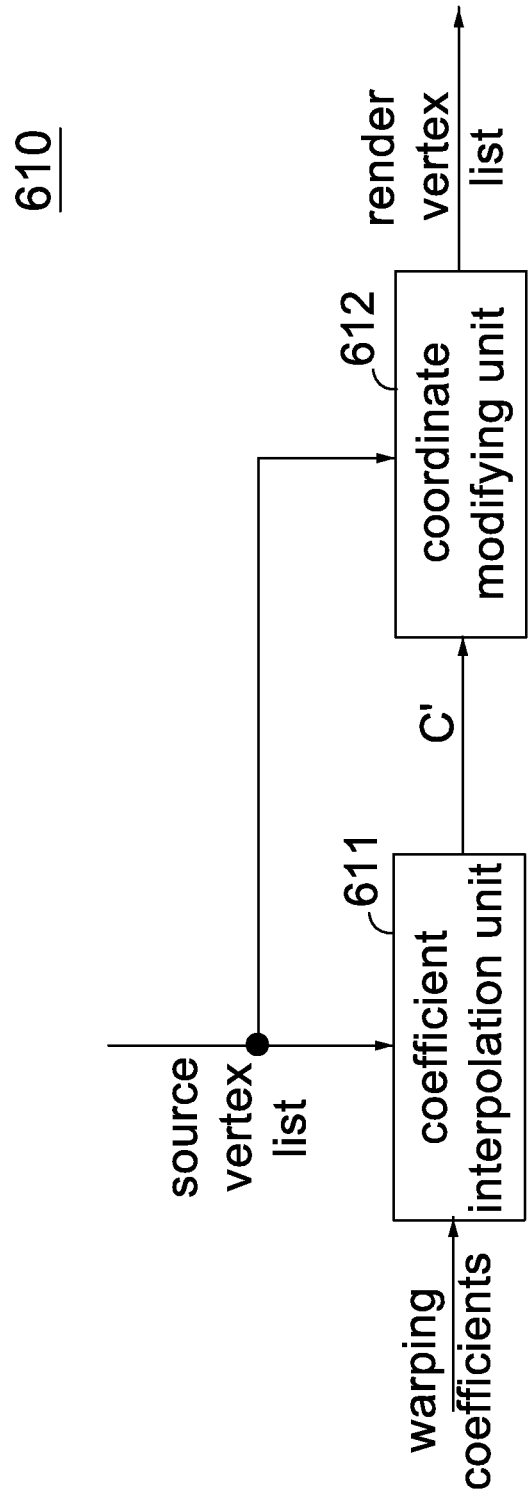
FIG. 6B is a diagram showing a vertex processing device according to an embodiment of the invention.
Figure 7C:
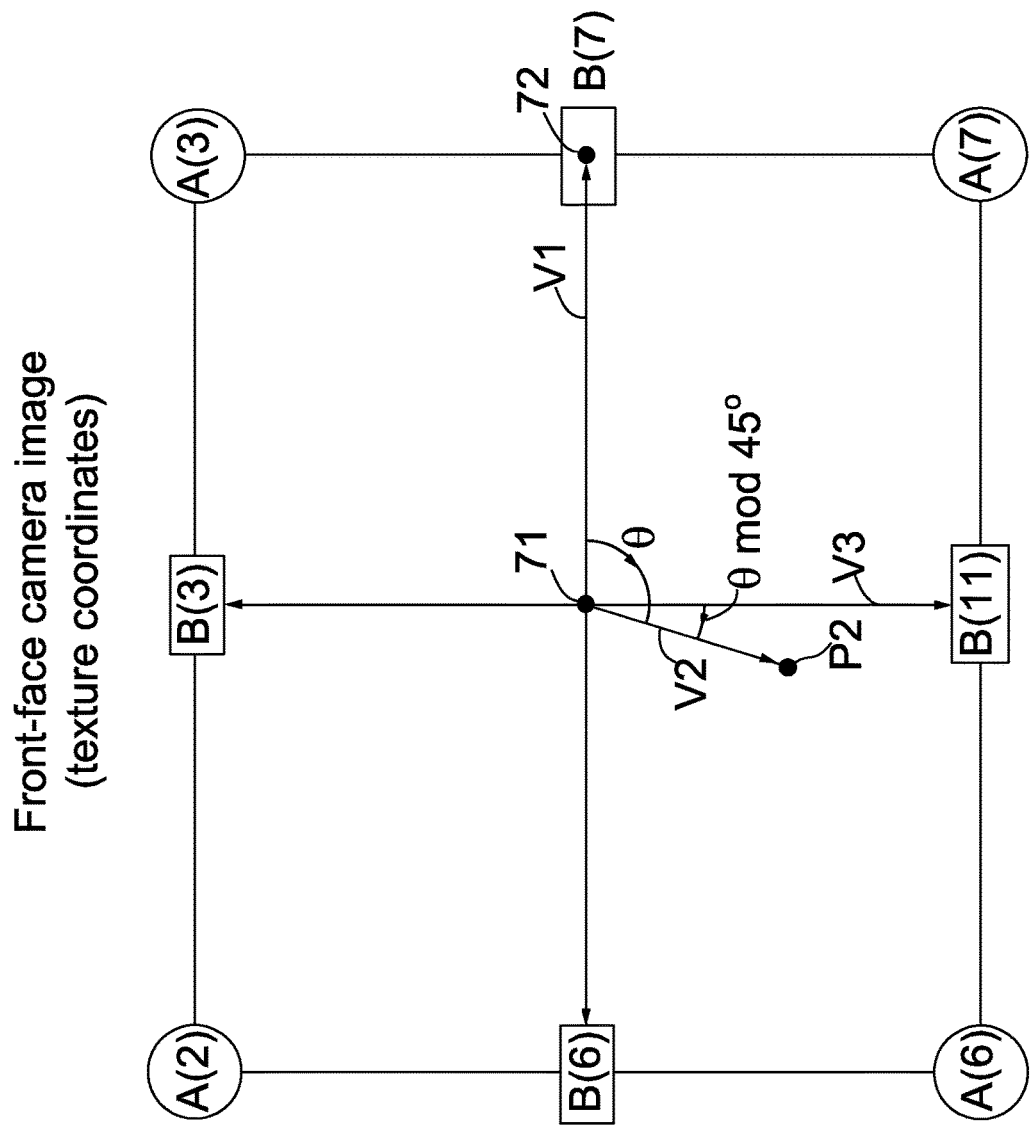
FIG. 7C is an example showing a relation between a target vertex P2 and eight control regions in a front-face camera image.

Referring to FIG. 6B, the vertex processing device 610 comprises a coefficient interpolation unit 611 and a coordinate modifying unit 622. In the example of FIG. 7B, there are twenty control regions Reg(1)~Reg(20) in the equirectangular panoramic image, and thus the twenty control regions Reg(1)~Reg(20) respectively have twenty warping coefficients Cw(1)~Cw(20) or twenty warping degrees of Cw(1)~Cw(20). At first, the coefficient interpolation unit 611 receives a target vertex P2 (with its data structure) from the source vertex list and twenty warping coefficients Cw(1)~Cw(20) from the stitching decision unit 650. Then, the coefficient interpolation unit 611 sequentially performs interpolation operations over two of the twenty warping coefficients according to original texture coordinates of the target vertex P2 to generate an interpolated warping coefficient C' for each camera image associated with the target vertex P2. Take the front-face camera image for example. Assuming that the target vertex P2 has original texture coordinates (u2, v2) in the front-face camera image according to the source vertex list. FIG. 7C is an example showing a relation between the target vertex P2 and eight control regions in the front-face camera image. In the example of FIG. 7C, the eight control regions (A(2)~A(3), A(6)~A(7), B(3), B(6), B(7), B(11)) in the front-face camera image respectively have eight warping degrees of (Cw(2)~Cw(3), Cw(6)~Cw(7), Cw(11), Cw(14), Cw(15), Cw(19)). In one embodiment, the coefficient interpolation unit 611 generates the interpolated warping coefficient C' for the target vertex P2 with original texture coordinates (u2, v2) in the front-face camera by performing interpolation operation over two warping coefficients of its two immediately-adjacent control regions according to an angle θ. Here, the angle θ is formed between a first vector V1 starting from the image center 71 (with texture coordinates ($u_{center}$, $v_{center}$)) to the location 72 of a starting control region B(7) and a second vector V2 starting from the image center 71 to the target vertex P2 (u2, v2). Assuming that the rotation of the angle is clockwise and θ=93°, because there are eight control regions in the front-face camera, then 360°/8=45°, idx=θ/45°=2 and θ mod 45°=θ−idx*45°=3°. Thus, its two immediately-adjacent control regions are A(6)(=Reg(6)) and B(11) (=Reg(19)) and the interpolated warping coefficient C' for the target vertex P2 in the front-face camera image is defined/calculated by the following equation: C'=Cw(6)*(3/45)+Cw(19)*(1−3/45). Examples of the location 72 of the control region include, without limitation, a gravity center of the control region, a region center of the control region, and a median point of the control region. Please note that the starting control region B(7) is provided by example and not limitation of the invention. In an alternative embodiment, another control region, such as B(6), can be selected as the starting control region for the front-face camera image as long as the starting control region is located at the same direction with respect to the image center 71 (with texture coordinates ($u_{center}$, $v_{center}$)) for each camera image.

Take the above target vertex P2 for example. To simplify the above calculation, in addition to performing all the operations of the correspondence generator 15, the correspondence generator 65 additionally pre-determines which two control regions (i.e., A(6)(=Reg(6)) and B(11)(=Reg(19))) are immediately adjacent to the target vertex P2 and writes their indices (6 and 19) to the "warping coefficient indices" field of the data structure of the target vertex P2 in the source vertex list; besides, the correspondence generator 65 additionally pre-calculates a blending weight (=3/45) for warping coefficients (Cw(6) and Cw(19)) and writes it to the "Alpha" field in the front-face camera image of the data structure of the target vertex P2 in the source vertex list. Please note that the blending weight (=3/45) for warping coefficients (Cw(6) and Cw(19)) is related to: (i) the angle θ between the first vector V1 and the second vector V2; (ii) θ mod 45°=θ−idx*45°=3° between the third vector V3 (starting from the image center 71 to the location of the edge control region B(11)) and the second vector V2; and (3) the number of control regions in each camera image because 45°=360°/8. Please also note that the warping coefficients (Cw(1) to Cw(20)) outputted from the stitching decision unit 650 are arranged as a 1-D warping coefficient array or a 1-D data stream. After receiving the source vertex list, the coefficient interpolation unit 611 simply retrieves two warping coefficients (Cw(6) and Cw(19)) from the 1-D warping coefficient array based on the "warping coefficient indices" field (i.e., 6 and 19) in the front-face camera image for the target vertex P2 and calculates the interpolated warping coefficient C' based on the "Alpha" field (i.e., 3/45) in the front-face camera image for the target vertex P2 (see table 2).

After receiving the interpolated warping coefficient C', the coordinate modifying unit 612 calculates modified texture coordinates (u2', v2') in the front-face camera image for the target vertex P2 according to the following equations: u2'=(u2−$u_{center}$)*C'+$u_{center}$, v2'=(v2−$v_{center}$)*C'+$v_{center}$. In this manner, the original texture coordinates (u2, v2) of the target vertex P2 is changed to the modified texture coordinates (u2', v2') in the front-face camera.

Likewise, eight warping coefficients (Cw(1), Cw(4), Cw(5), Cw(8), Cw(9), Cw(13), Cw(16), Cw(17)) corresponding to eight control regions (A(1), A(4), A(5), A(8), B(1), B(5), B(8), B(9)) are used to calculate modified texture coordinates for a vertex with its original texture coordinates in the back-face camera image; eight warping coefficients (Cw(1)~Cw(4), Cw(9)~Cw(12)) corresponding to eight control regions (A(1)~A(4), B(1)~B(4)) are used to calculate modified texture coordinates for a vertex with its original texture coordinates in the top-face camera image. In this manner, the vertex processing device 610 sequentially modifies all the texture coordinates in six-face camera images based on each vertex from the source vertex list according to the twenty warping coefficients Cw(1)~Cw(20) to generate the render vertex list. Table 3 shows an exemplary data structure of each vertex in the render vertex list.

TABLE 3

| Attributes | Descriptions |
|---|---|
| (x, y) | Equirectangular coordinates |
| N | Number of covering/overlapping camera images |
| Pole flag | Indicate whether the vertex is a pole point(e.g., 1: pole point; 0: not pole point) |
| $ID_1$ | ID of first camera image |
| ($u'_1$, $v'_1$) | Modified texture coordinates in first camera image |
| $w_1$ | Blending weight for stitching in first camera image |
| ... | ... |
| $ID_N$ | ID of $N^{th}$ camera image |
| ($u'_N$, $v'_N$) | Modified texture coordinates in $N^{th}$ camera image |
| $w_N$ | Blending weight for stitching in $N^{th}$ camera image |

In comparison with the source vertex list in Table 2, only the texture coordinates for each camera image are modified and two fields (i.e., the warping coefficient indices ($idx_{i0}$, $idx_{i1}$) and the blending weight for warping coefficients ($Alpha_i$)) in each camera image are discarded by the vertex processing device 610 in the data structure of each vertex in the render vertex list, where i=1~N. The other fields in the render vertex list are the same as those in the source vertex list.

Figure 7D:
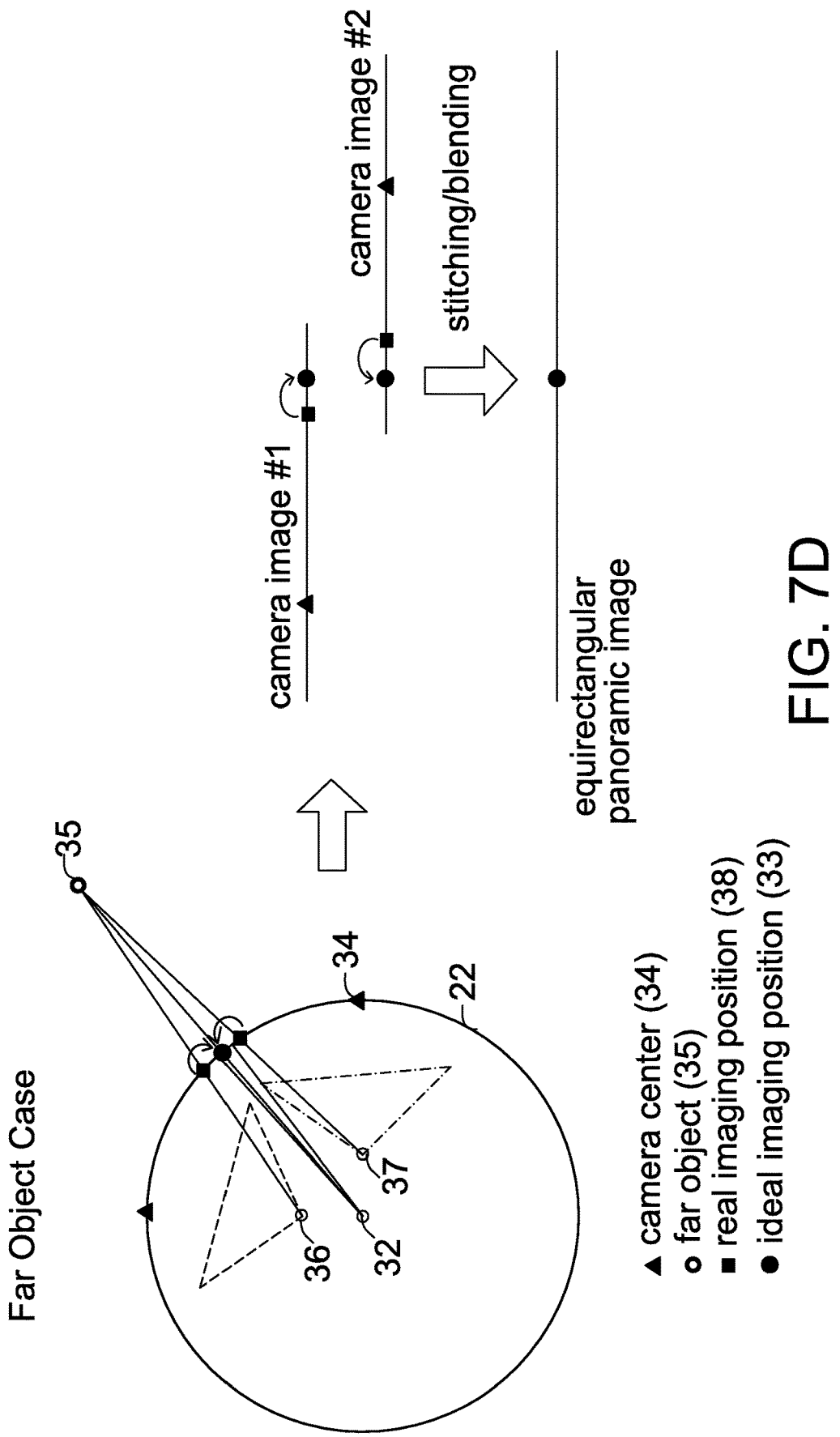
FIGS. 7D-7E show how the mismatch image defects are improved for a far object case and a near object case after all the texture coordinates of all vertices are modified according to warping coefficients by the vertex processing device 610.
Figure 7E:
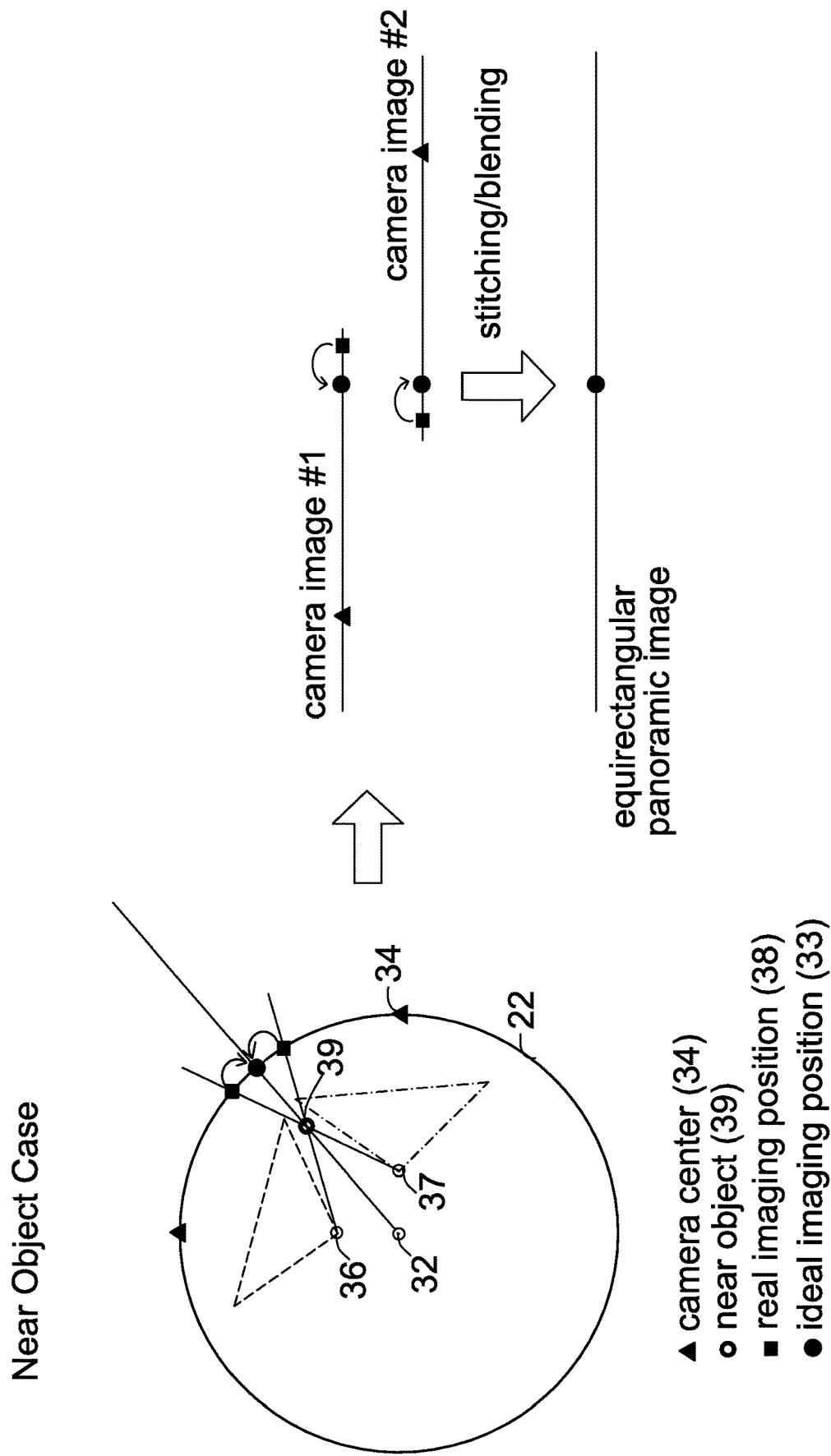

After all the texture coordinates of all vertices are modified according to warping coefficients (Cw(1)~Cw(20)) by the vertex processing device 610, the mismatch image defects would be greatly improved as shown in FIGS. 7D-7E. FIGS. 7D-7E show how the mismatch image defects are improved for a far object case and a near object case. The term "far object" refers to an object 35 located outside the sphere 22 (e.g., with 2 meter radius, r=2) as shown in FIG. 7D and the term "near object" refers to an object 39 located inside the sphere 22 as shown in FIG. 7E. Because the real focal points 36 and 37 for camera #1 and camera #2 are separated from the optimal focal point 32, two real imaging positions 38 on the image plane 22 are separately shifted from the ideal imaging position 33 as shown in FIGS. 7D-7E. In the far object case, its real imaging positions 38 are relatively close to the image centers 34, so the vertex processing device 610 needs to "push" its real imaging positions 38 away from the image centers 34 as shown in FIG. 7D. After the vertex processing device 610 modifies its texture coordinates (from positions 38 to positions 33) in the camera images #1 and #2 according to warping coefficients (Cw(1)~Cw(20)), the previous mismatch image defect is significantly improved. Contrarily, in the near object case, its real imaging positions 38 are relatively far from the image centers 34, so the vertex processing device 610 needs to "pull" its real imaging positions 38 nearer to the image centers 34 as shown in FIG. 7E. After the vertex processing device 610 modifies its texture coordinates (from positions 38 to positions 33) in the camera image #1 and the camera image #2 according to warping coefficients Cw(1)~Cw(20), the previous mismatch image defect is significantly improved.

The compensation device 600 operates in one of a rendering mode and a measure mode. Through a control signal CS1, the stitching decision unit 650 is enabled in the measure mode, and disabled in the rendering mode. After receiving the assembled vertex list and the six-face camera images, through the control signal CS1, the image processing apparatus 630 either generates region errors $Er(1)$~$Er(20)$ for the twenty control regions ($Reg(1)$~$Reg(20)$) in the measure mode or generates an equirectangular panoramic image in the rendering mode. The detailed operations of the image processing apparatus 630 generating the equirectangular panoramic images are disclosed in U.S. patent application Ser. No. 15/211,732 and U.S. Pat. No. 10,104,288 B2 (the disclosures of which are incorporated herein by reference in their entirety).

Figure 8:
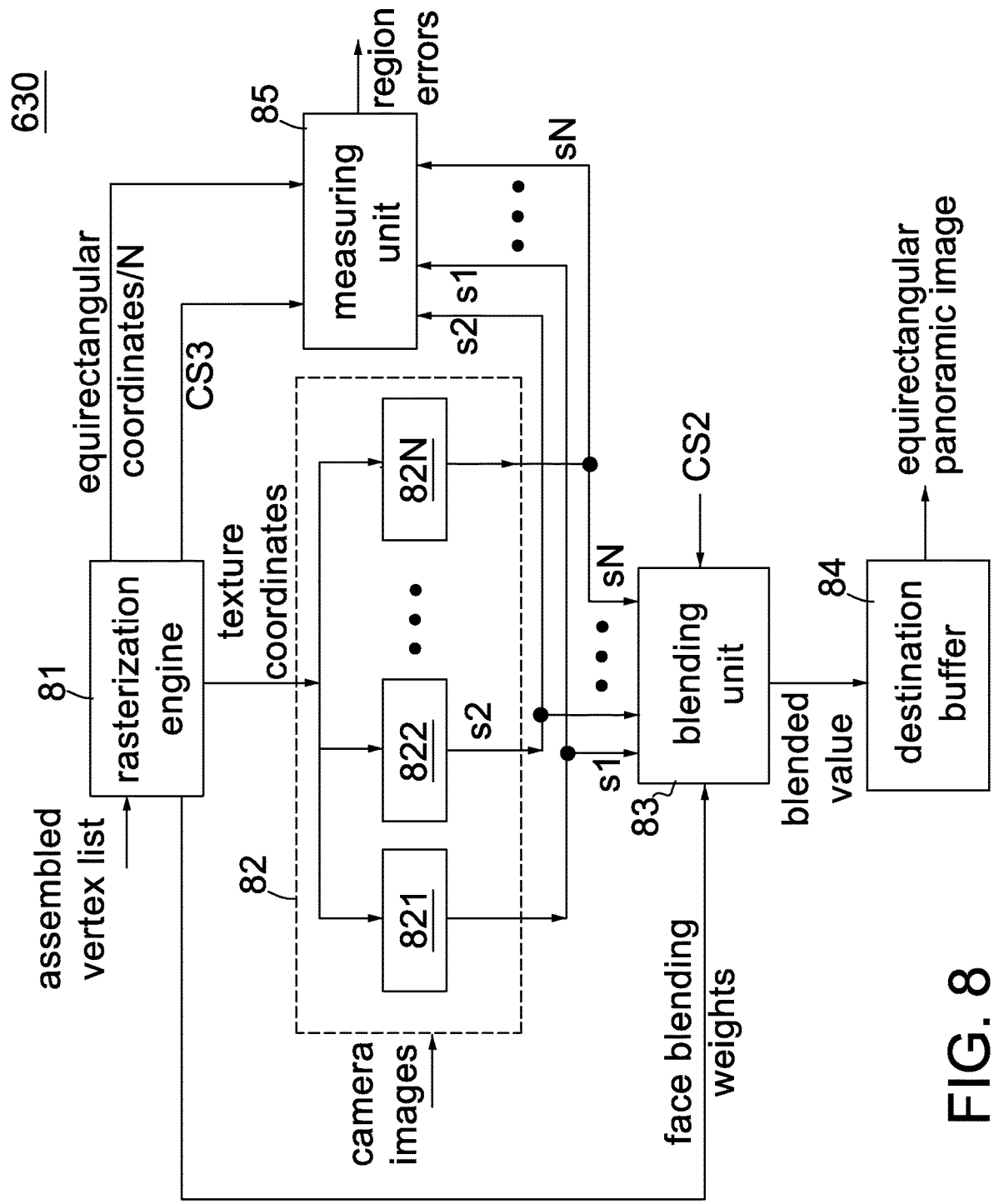
FIG. 8 is a schematic diagram showing the image processing apparatus according to one embodiment of the invention.

FIG. 8 is a schematic diagram showing the image processing apparatus according to one embodiment of the invention. Referring to FIG. 8, the image processing apparatus 630 includes a rasterization engine 81, a texture mapping circuit 82, a blending unit 83, a destination buffer 84 and a measuring unit 85. The texture mapping circuit 82 includes N number of texture mapping engines 821~82N.

In the measure mode, at first, the rasterization engine 81 receives the assembled vertex list and retrieves a group of vertices forming a polygon from the assembled vertex list at a time. Then, the rasterization engine 81 checks N number of covering/overlapping camera images in its data structure in the assembled vertex list for each of the vertices forming the polygon. If N=1, the rasterization engine 81 de-asserts the control signal CS3 to disable the measuring unit 85, otherwise, asserts the control signal CS3 to enable the measuring unit 85. If N>1, the rasterization engine 81 performs polygon rasterization operations for a point Q (having equirectangular coordinates (x, y)) in the polygon of the polygon mesh of FIG. 2D to generate N pairs of texture coordinates and N face blending weights for N camera images.

Example camera images include, with limitation, YUV color images, RGB color images, luminance images, edge images and motion vector images. As well known in the art, an edge image can be obtained by applying an edge detection operator (such as a Canny edge detector or a Sobel operator) over a normal color image; a motion vector image can be obtained by performing motion estimation using known algorithms (such as block-matching algorithm, pixel recursive algorithm or optical flow) over two consecutive camera images (such as two top-face camera images (t0) and (t1)).

For N>1, according to the N pairs of texture coordinates, N texture mapping engines 821~82N of the texture mapping circuit 82 texture map the texture data from the N camera images using any appropriate method (such as nearest-neighbour interpolation, bilinear interpolation or trilinear interpolation) to generate N sample values (s1~sN) in parallel. Here, the sample value (s1~sN) may be a luma value, a chroma value, an edge value, a pixel color value (RGB), or a motion vector. In measure mode, the blending unit 83 is disabled by a control signal CS2, and the measuring unit 85 estimates/measures region errors $Er(1)$~$Er(20)$ for the twenty control regions $Reg(1)$~$Reg(20)$ in the equirectangular panoramic image according to the equirectangular coordinates (x, y) of the point Q and the N sample values (s1~sN).

According to the equirectangular coordinates (x, y), the measuring unit 85 determines whether the point Q falls in one of the twenty control regions and then starts to estimate/measure the region error of a control region if the point Q falls in the control region. The measuring unit 85 may estimate/measure the region errors of the control regions by using known algorithms, such as SAD (sum of absolute differences), SSD (sum of squared differences), MAD (median absolute deviation), etc. For example, if the point Q is determined to fall in region B(3), i.e., N=2, the measuring unit 85 may accumulate the absolute value of the sample value difference between each point in the control region B(3) of the top-face camera image and its corresponding point in the control region B(3) of the front-face camera image to obtain the SAD value as the region error $Er(11)$ for the region B(3), by using the following equations: $E=|s1-s2|$; $Er(11)+=E$. As another example, if the point Q is determined to fall in region A(2), i.e., N=3, the measuring unit 85 may accumulate the absolute value of the sample value difference among each point in the control region A(2) of the top-face camera image, its corresponding point in the control region A(2) of the front-face camera image and its corresponding point in the control region A(2) of the left-face camera image to obtain the SAD value as the region error $Er(2)$ for the region A(2), by using the following equations: $E=|s1-s2|+|s1-s3|+|s2-s3|$; $Er(2)+=E$. In this manner, the measuring unit 85 measures twenty region errors $Er(1)$~$Er(20)$ for the twenty control regions $Reg(1)$~$Reg(20)$.

Figure 2D:
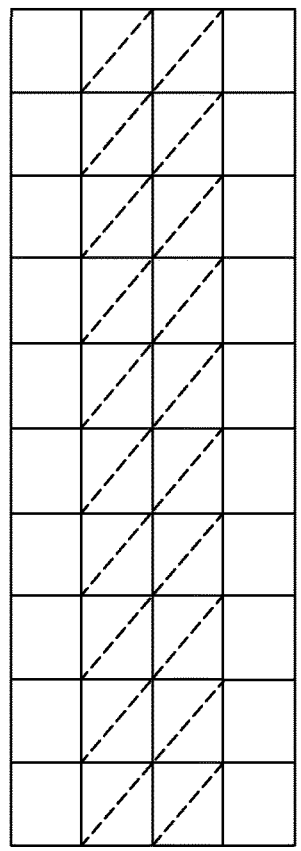
FIG. 2D shows a polygon mesh composing/modeling the equirectangular panoramic image.
Figure 2C:
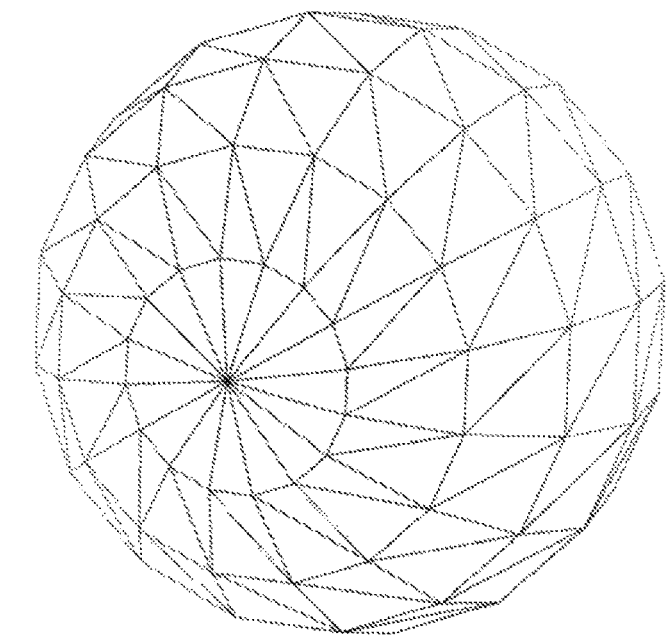
FIG. 2C shows a triangle mesh modeling a surface of the sphere 22.

In one embodiment, the operations of the image processing apparatus 630 in the measure mode are described below with the assumption that the rasterization engine 81 retrieves three vertices forming a triangle from the assembled vertex list at a time for the middle rows (rather than the top row and the bottom row) of the polygon mesh in FIG. 2D, each of three vertices (A, B, C) of one triangle of the polygon mesh is overlapped with two-face camera images (e.g., front, top; N=2), and the three vertices (A, B, C) have the following data structures contained in the assembled vertex list: vertex A:$\{(x_A, y_A), 2, 0, ID_{Front}, (u_{1A}, v_{1A}), w_{1A}, ID_{Top}, (u_{2A}, v_{2A}), w_{2A}\}$; vertex B:$\{(x_B, y_B), 2, 0, ID_{Front}, (u_{1B}, v_{1B}), w_{1B}, ID_{Top}, (u_{2B}, v_{2B}), w_{2B}\}$; vertex C:$\{(x_C, y_C), 2, 0, ID_{Front}, (u_{1C}, v_{1C}), w_{1C}, ID_{Top}, v_{2C}), w_{2C}\}$. None of the vertices ABC is derived from a pole point.

The rasterization engine 81 performs triangle rasterization operations for each point, such as point Q, in triangle ABC. Specifically, the rasterization engine 81 sends the equirectangular coordinates (x, y) of the point Q to the measuring unit 85, and computes texture coordinates and a face blending weight for each camera image based on the point Q having equirectangular coordinates (x, y) within the triangle ABC of the polygon mesh by using the following steps: 1. Compute three spatial weighting values (a,b,c) according to equirectangular coordinates ($x_A, y_A, x_B, y_B, x_C, y_C$, x, y) by using a barycentric weighting method. 2. compute a face blending weight $fw_1$ for a sample point $Q_F$ (corresponding to point Q) in front-face camera image: $fw_1=a*w_{1A}+b*w_{1B}+c*w_{1C}$; compute a face blending weight $fw_2$ for a sample point $Q_T$ (corresponding to point Q) in top-face camera image: $fw_2=a*w_{2A}+b*w_{2B}+c*w_{2C}$. 3. compute texture coordinates for the sample point $Q_F$ (corresponding to point Q) in front-face camera image: $(u_F,v_F)=(a*u_{1A}+b*u_{1B}+c*u_{1C}, a*v_{1A}+b*v_{1B}+c*v_{1C})$; compute texture coordinates for the sample point $Q_T$ (corresponding to point Q) in top-face camera image: $(u_T,v_T)=(a*u_{2A}+b*u_{2B}+c*u_{2C}, c*v_{2A}+b*v_{2B}+c*v_{2C})$. Finally, the rasterization engine 81 sends the two pairs of texture coordinates $(u_F,v_F)$ and $(u_T,v_T)$ to the texture mapping circuit 82 in parallel. Here, a+b+c=1 and $fw_1+fw_2=1$. According to the two pairs of texture coordinates $(u_F,v_F)$ and $(u_T,v_T)$, two texture mapping engines 821 and 822 texture map the texture data of the two-face camera images using any appropriate method (such as nearest-neighbour interpolation, bilinear interpolation or trilinear interpolation) to generate two sample values s1 and s2, respectively. According to the equirectangular coordinates (x, y), the measuring unit 85 determines whether the point Q falls in one of the twenty control regions, such as B(3), and then starts to estimate/measure the region error of the control region B(3) if the point Q is determined to fall in region B(3). The measuring unit 85 accumulates the absolute value of the sample value difference between s1 and s2 to obtain the SAD value as the region error Er(11) for the control region B(3), by using the following equations: E=|s1-s2|; Er(11)+=E. In this manner, the measuring unit 85 measures twenty region errors Er(1)~Er(20) for the twenty control regions Reg(1)~Reg(20).

In an alternative embodiment, the operations of the image processing apparatus 630 in the measure mode are described below with the assumption that the rasterization engine 81 retrieves a group of four vertices forming a quadrilateral from the assembled vertex list at a time for the top row and the bottom row of the polygon mesh in FIG. 2D, each of four vertices (A1, B1, C1, D1) of one quadrilateral of the polygon mesh is overlapped with three-face camera images (e.g., front, top, right; N=3), and the four vertices (A1, B1, C1, D1) have the following data structures contained in the assembled vertex list: vertex A1:$\{(x_A, y_A), 3, 0, ID_{Front}, (u_{1A}, v_{1A}), w_{1A}, ID_{Top}, (u_{2A}, v_{2A}), w_{2A}, ID_{Right}, (u_{3A}, v_{3A}), w_{3A}\}$; vertex B:$\{(x_B, y_B), 3, 0, ID_{Front}, (u_{1B}, v_{1B}), w_{1B}, ID_{Top}, (u_{2B}, v_{2B}), w_{2B}, ID_{Right}, (u_{3B}, v_{3B}), w_{3B}\}$; vertex C1:$\{(x_C, y_C), 3, 1, ID_{Front}, (u_{1C}, v_{1C}), w_{1C}, ID_{Top}, (u_{2C}, v_{2C}), w_{2C}, ID_{Right}, (u_{3C}, v_{3C}), w_{3C}\}$; vertex D1:$\{(x_D, y_D), 3, 1, ID_{Front}, (u_{1D}, v_{1D}), w_{1D}, ID_{Top}, (u_{2D}, v_{2D})ID_{Right}, (u_{3D}, v_{3D})\}$. The vertices C1 and D1 are derived from pole point(s).

The rasterization engine 81 performs quadrilateral rasterization operations for each point, such as point S, in quadrilateral A1 B1C1D1. Specifically, the rasterization engine 81 sends the equirectangular coordinates (x, y) of a point S to the measuring unit 85, and computes texture coordinates and a face blending weight for each camera image based on the point S having equirectangular coordinates (x, y) within the quadrilateral A1 B1C1 D1 of the polygon mesh by using the following steps: 1. Compute four spatial weighting values (a,b,c,d) according to equirectangular coordinates $(x_A, y_A, x_B, y_B, x_C, y_C, x_D, y_D, x, y)$ by using a bi-linear interpolation method. 2. compute a face blending weight $fw_1$ for a sample point $S_F$ (corresponding to point S) in front-face camera image: $fw_1=a*w_{1A}+b*w_{1B}+c*w_{1C}+d*w_{1D}$; compute a face blending weight $fw_2$ for a sample point $S_T$ (corresponding to point S) in top-face camera image: $fw_2=a*w_{2A}+b*w_{2B}+c*w_{2C}+d*w_{1D}$; compute a face blending weight $fw_3$ for a sample point $S_R$ (corresponding to point S) in right-face camera image: $fw_3=a*w_{3A}+b*w_{3B}+c*w_{3C}+d*w_{3D}$. 3. compute texture coordinates for the sample point $S_F$ (corresponding to point S) in front-face camera image: $(u_F,v_F)=(a*u_{1A}+b*u_{1B}+c*u_{1C}+d*u_{1D}, c*v_{1A}+b*v_{1B}+c*v_{1C}+d*v_{1D})$; compute texture coordinates for the sample point $S_T$ (corresponding to point S) in top-face camera image: $(u_T,v_T)=(a*u_{2A}+b*u_{2B}+c*u_{2C}+d*u_{2D}, a*v_{2A}+b*v_{2B}+c*v_{2C}+d*v_{2D})$; compute texture coordinates for the sample point $S_R$ (corresponding to point S) in right-face camera image: $(u_R,v_R)=(a*u_{3A}+b*u_{3B}+C*u_{3C}+d*u_{3D}, a*v_{3A}+b*v_{3B}+c*v_{3C}+d*v_{3D})$. Finally, the rasterization engine 81 sends the three pairs of texture coordinates $(u_F,v_F)$, $(u_T,v_T)$ and $(u_R,v_R)$ to the texture mapping engines 821~823 in parallel. Here, a+b+c+d=1 and $fw_1+fw_2+fw_3=1$. According to the two pairs of texture coordinates $(u_F,v_F)$, and $(u_T,v_T)$ and $(u_R,v_R)$, two texture mapping engines 821~823 texture map the texture data of the three-face camera images using any appropriate method (such as nearest-neighbour interpolation, bilinear interpolation or trilinear interpolation) to generate three sample values s1~s3, respectively. According to the equirectangular coordinates (x, y), the measuring unit 85 determines whether the point S falls in one of the twenty control regions, such as A(3), and then starts to estimate/measure the region error of the control region A(3) if the point S is determined to fall in region A(3). The measuring unit 85 accumulates the absolute value of the sample value difference between s1, s2 and s3 to obtain the SAD value as the region error Er(3) for the control region A(3), by using the following equations: E=|s1−s2|+|s1−s3|+|s2−s3|; Er(3)+=E. In this manner, the measuring unit 85 measures twenty region errors Er(1)~Er(20) for the twenty control regions Reg(1)~Reg(20).

Figure 3A:
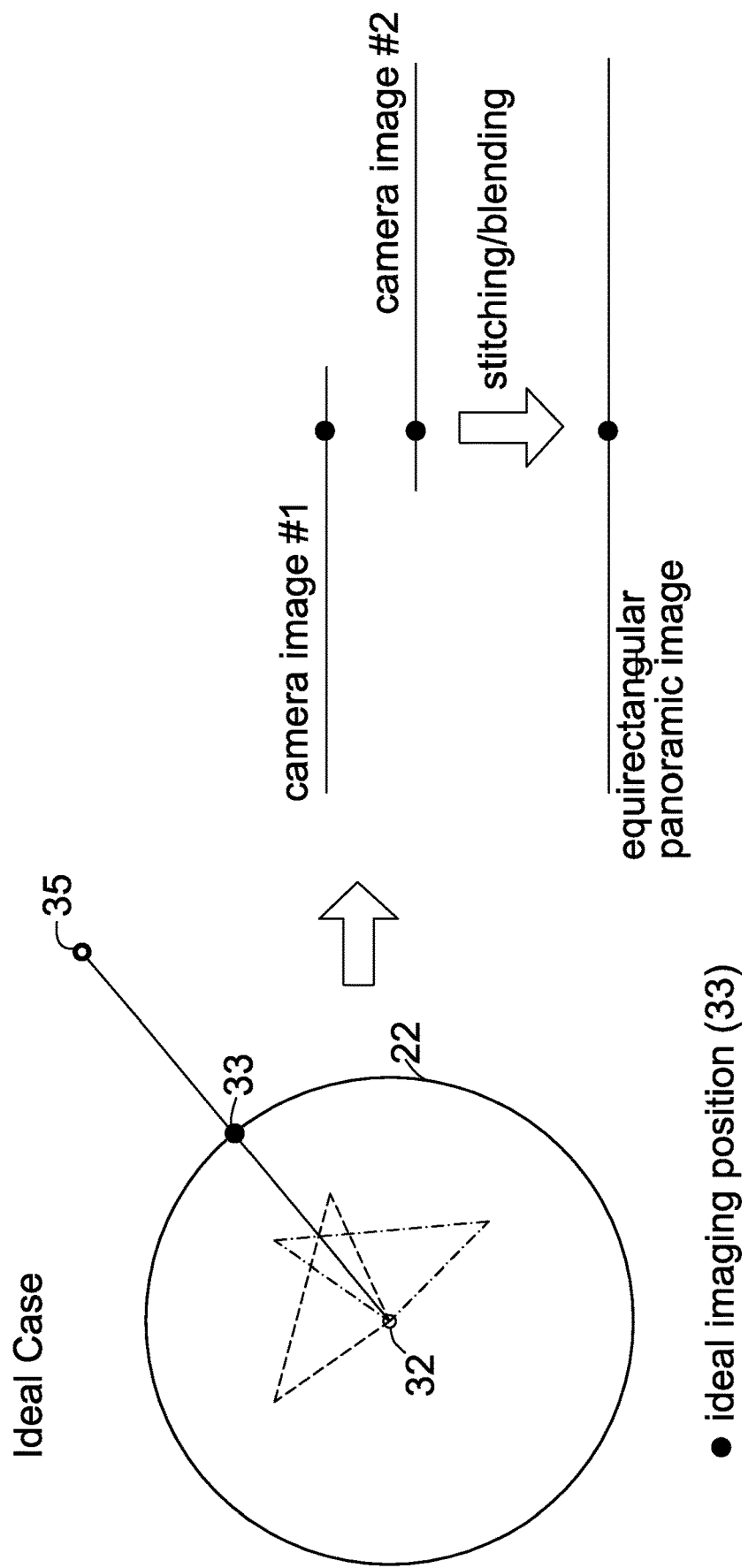
FIGS. 3A and 3B show different stitching results derived from un-shifted/shifted camera centers.
Figure 3B:
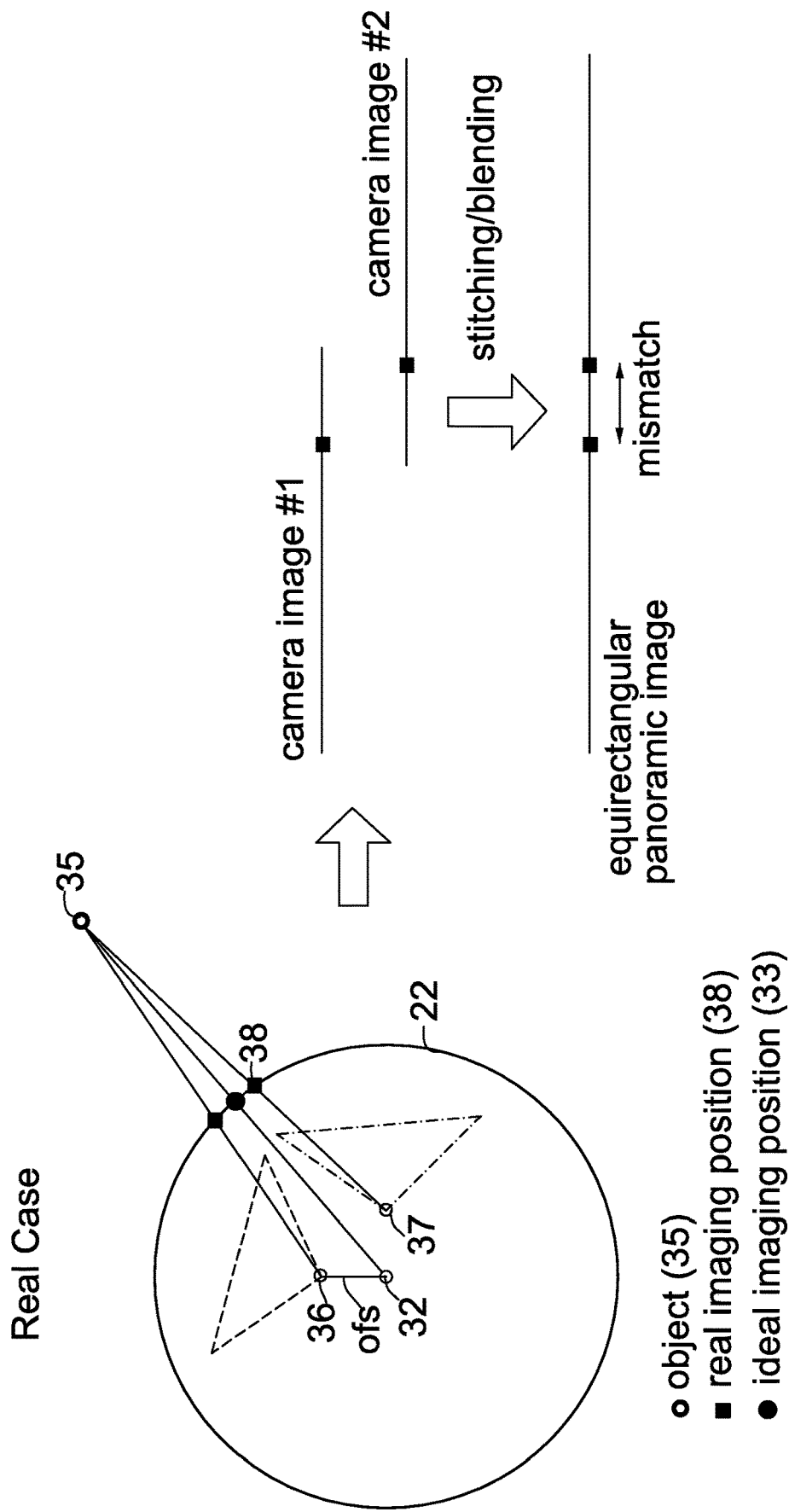
Figure 4:
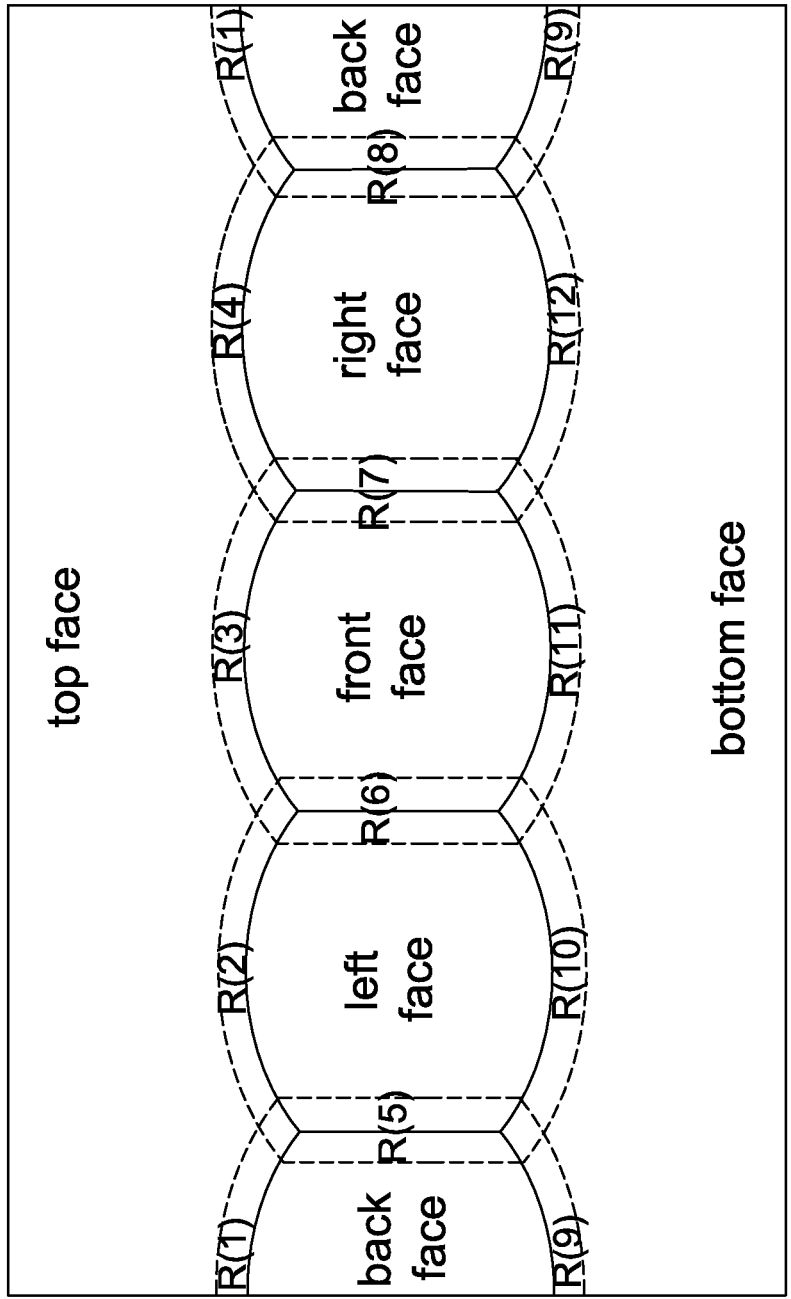
FIG. 4 shows an exemplary equirectangular panoramic image with twelve overlap regions according to the prior art.

Referring back to FIG. 6A, in measure mode, the stitching decision unit 650 sets the twenty warping coefficients Cw(1)~Cw(20) to different value ranges for measuring the region errors according to the offset ofs in FIG. 3B, and the twenty warping coefficients are set to the same value at a time. For example, in a case of ofs=3 cm, the twenty warping coefficients Cw(1)~Cw(20) are set to values ranging from 0.96 to 1.04 and there would be nine times of measurement if each increment is 0.01; in a case of ofs=1 cm, the twenty warping coefficients Cw(1)~Cw(20) are set from 0.99 to 1.00 and there would be ten times of measurement if each increment is 0.001.

Figure 9A:
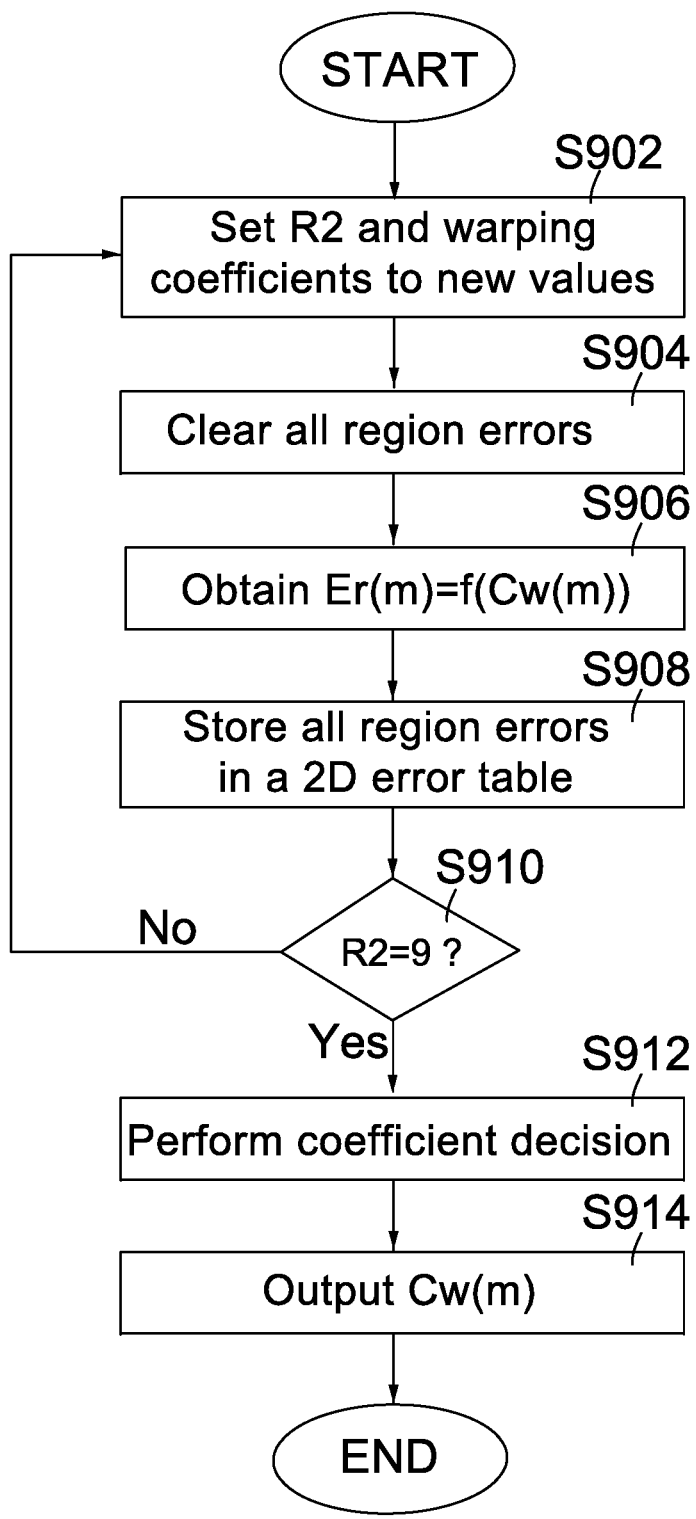
FIG. 9A is a flow chart showing operations of the stitching decision unit 650 in a measure mode according to an embodiment of the invention.

FIG. 9A is a flow chart showing operations of the stitching decision unit 650 in measure mode according to an embodiment of the invention. Hereinafter, the operations of the stitching decision unit 650 in measure mode are described with reference to FIGS. 8 and 9A and with the assumption that ofs=3 cm.

Step S902: Respectively set the R2 number of iterations and warping coefficients to new values. In one embodiment, set the R2 number of iterations to 1 in a first round and increment R2 by 1 in each of the following rounds; if ofs=3 cm, set all the warping coefficients Cw(1)~Cw(20) to 0.96 in a first round, and then set them to 0.97, . . . , 1.04 in order in the following rounds.

Step S904: Clear all region errors Er(m), where m=1, 2, . . . , 20.

Step S906: Measure/obtain region errors for the twenty control regions in the equirectangular panoramic image (as shown in FIG. 7A) by the image processing apparatus 630 after the operations of the vertex processing device 610 and the primitive assemble unit 120 are done base on the warping coefficients set by Step S902. For ease of description, this step S906 is denoted by Er(m)=f(Cw(m)), where m=1, 2, . . . , 20; f( ) denotes a function that measures the region error Er(m) (by the image processing apparatus 630) based on its corresponding warping coefficient Cw(m).

Step S908: Store all region errors Er(1)~Er(20) in a 2D error table. Table 4 shows an exemplary 2D error table for ofs=3 cm (warping coefficients ranging from 0.96 to 1.04).

TABLE 4

|  | 1st | 2nd | 3rd | - - - | 7th | 8th | 9th |
|---|---|---|---|---|---|---|---|
| warping coefficient | 0.96 | 0.97 | 0.98 | - - - | 1.02 | 1.03 | 1.04 |
| Er(1) |  |  |  |  |  |  |  |
| Er(2) |  |  |  | - - - |  |  |  |
| Er(17) |  |  |  | - - - |  |  |  |
| Er(18) |  |  |  |  |  |  |  |
| Er(19) |  |  |  |  |  |  |  |
| Er(20) |  |  |  |  |  |  |  |

In Table 4, there are twenty region errors Er(1)~Er(20) and nine different warping coefficients. Due to the fact that its data volume is huge, however, Table 4 shows only eight region errors and six warping coefficients and the others are skipped for the sake of brevity. Please note that the numbers of region errors and warping coefficients in the 2D error table are provided by way of example and not limitations of the invention. In the actual implementation, any other numbers of region errors and warping coefficients can be used in the 2D error table.

Step S910: Determine whether the R2 number of iterations reaches a limit value of 9. If YES, the flow goes to step S912; otherwise, the flow goes to Step S902.

Step S912: Perform coefficient decision according to the 2D error table.

Step S914: Output optimal warping coefficients Cw(m), where m=1, 2, ..., 20. In rendering mode, the optimal warping coefficients Cw(1)~Cw(20) are outputted to the vertex processing device 610 so that the image processing apparatus 630 generates a corresponding equirectangular panoramic image.

Figure 9B:
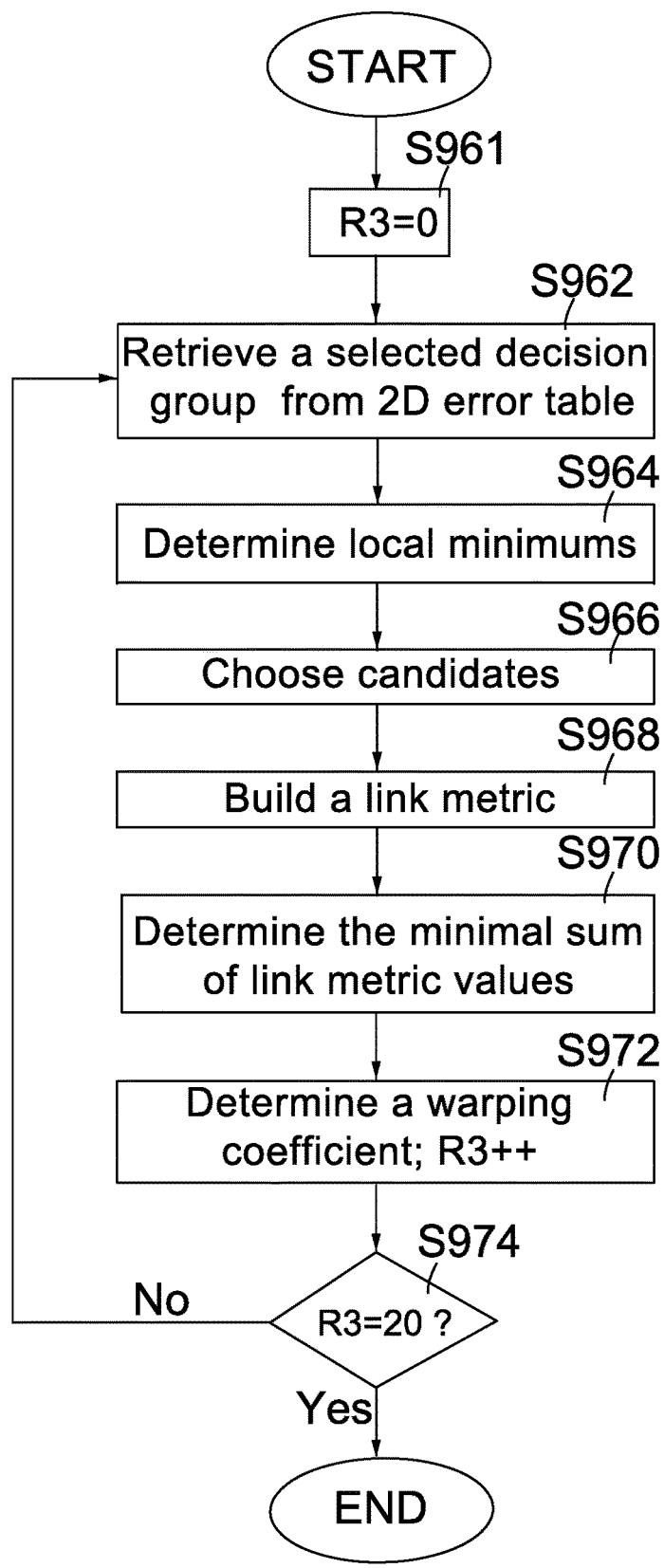
FIG. 9B is a flow chart showing the detailed operations of performing the coefficient decision in step S912 by the stitching decision unit 650 according to an embodiment of the invention.

FIG. 9B is a flow chart showing the detailed operations of performing the coefficient decision in step S912 by the stitching decision unit 650 according to an embodiment of the invention. Hereinafter, the operations of performing the coefficient decision is described with reference to FIGS. 7B and 9A-9B.

Step S961: Set R3 to 0 for initialization.

Step S962: Retrieve a selected decision group from the 2D error table. Referring back to FIG. 7B, there are eight corner control regions and twelve edge control regions.

TABLE 5

| index | warping coefficient | region error in A(1) | region error in B(1) | region error in A(4) |
|---|---|---|---|---|
| 1 | 0.96 | 1010 | 2600(*) | 820 |
| 2 | 0.97 | 1005 | 2650 | 750 |
| 3 | 0.98 | 1000 | 2800 | 700 |
| 4 | 0.99 | 900 | 3000 | 600(*) |
| 5 | 1.00 | 800(*) | 2700 | 650 |
| 6 | 1.01 | 850 | 2500 | 580 |
| 7 | 1.02 | 950 | 2400(*) | 500(*) |
| 8 | 1.03 | 960 | 2820 | 700 |
| 9 | 1.04 | 975 | 2900 | 800 |

As shown in Table 5, there is one local minimum among the nine region errors of A(1) and there are two local minimums among the nine region errors of B(1) and A(4), where each local minimum is marked with an asterisk.

Step S966: Choose candidates according to the local minimums. Table 6 shows candidates selected from the local minimums in Table 5, where WC denotes the warping coefficient and RE denotes the region error. The number of candidates is equal to the number of the local minimums in Table 5.

TABLE 6

| | A(1) | | | B(1) | | | A(4) | | |
|---|---|---|---|---|---|---|---|---|---|
| Number of local minimums | 1 | | | 2 | | | 2 | | |
| | index | WC | RE | index | WC | RE | index | WC | RE |
| Candidate[0] | 5 | 1.00 | 800 | 1 | 0.96 | 2600 | 4 | 0.99 | 600 |
| Candidate[1] | | | | 7 | 1.02 | 2400 | 7 | 1.02 | 500 |

Figure 5:
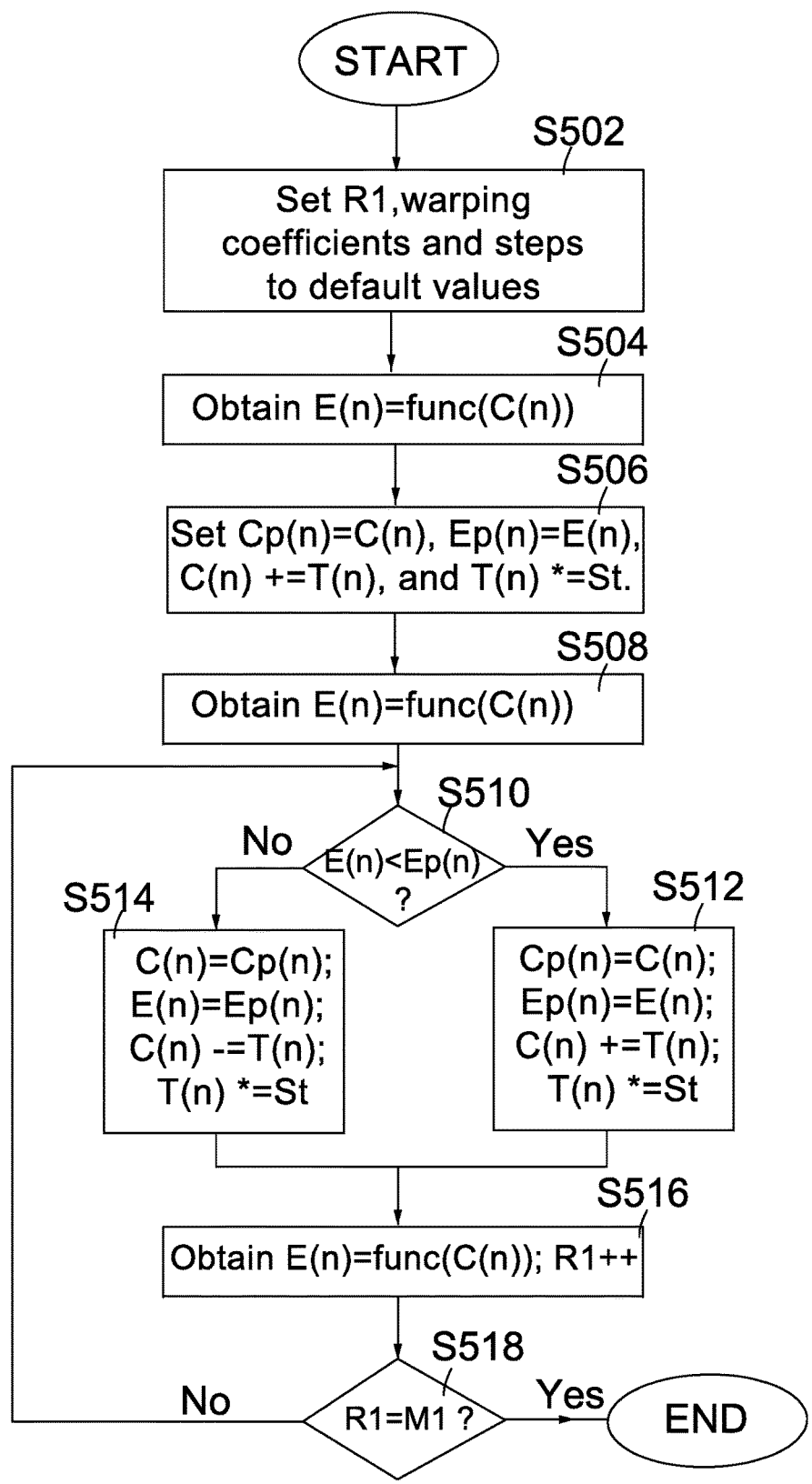
FIG. 5 is a flow chart showing operations of the optimize unit 450 using Hill-climbing search technique disclosed in U.S. Pat. No. 10,104,288 B2.

Since each corner control region adjoins three edge control regions, a selected corner control region along with its three adjacent edge control regions form a decision group to determine the optimal warping coefficient for the selected corner control region. Since each edge control region adjoins two corner control regions, a selected edge control region along with its three adjacent corner control regions form a decision group to determine the optimal warping coefficient for the selected edge control region. For example, an edge control region B(1) along with A(1) and A(4) form a decision group, and a corner control region A(6) along with B(6), B(10) and B(11) form a decision group. In comparison with the prior art (FIG. 5), a main difference is that the optimal warping coefficient of a selected control region is determined according to the region errors and the warping coefficient differences among its decision group in the invention. As an example, the following steps are described with the assumption that B(1) is selected and B(1) along with A(1) and A(4) form a selected decision group to determine the optimal warping coefficient for B(1).

Step S964: Determine local minimums among the region errors for each control region in the selected decision group. Table 5 is an example showing the region errors and the warping coefficients of B(1), A(1) and A(4).

Figure 9C:
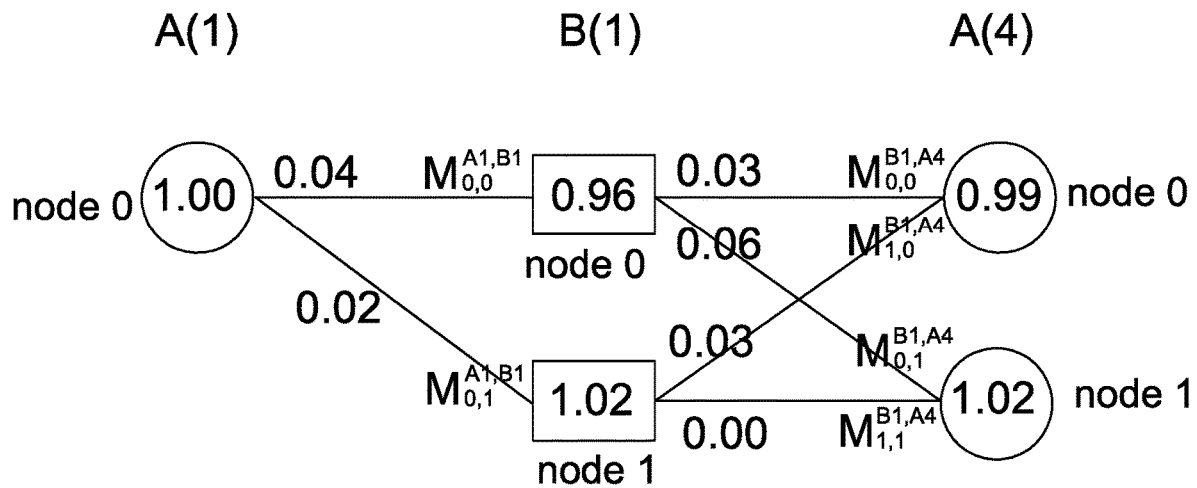
FIG. 9C shows an exemplary link metric.

Step S968: Build a link metric according to the candidates in Table 6. As shown in FIG. 9C, a link metric is built according to the candidates in Table 6.

Figure 9D:
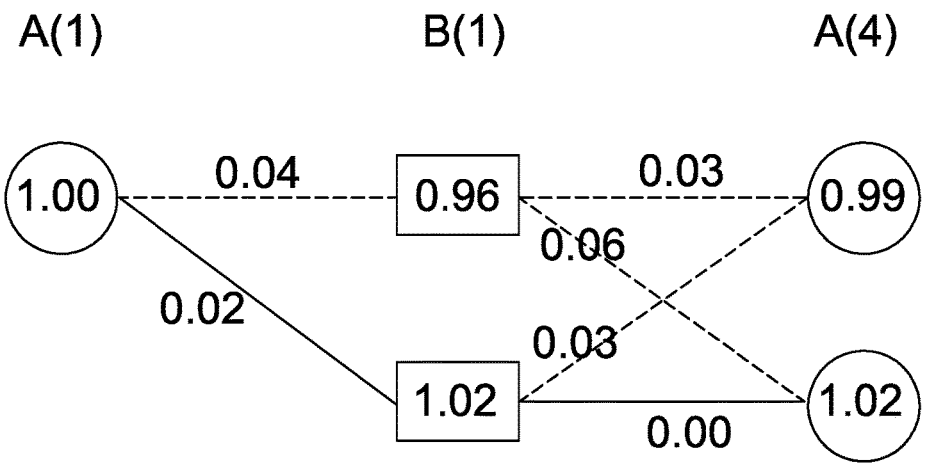
FIG. 9D shows path 0-1-1 (the solid-line path) is the minimal sum of link metric values among the paths based on FIG. 9C.

Step S970: Determine the minimal sum of link metric values among the paths. For the link metric values $M_{0,0}^{B1,A4}=0.03$ and $M_{0,1}^{B1,A4}=0.06$, their minimum value $d_0^{B1,A4}=\min(M_{0,0}^{B1,A4}, M_{0,1}^{B1,A4})=0.03$. For the link metric values $M_{1,0}^{B1,A4}=0.03$ and $MM_{1,1}^{B1,A4}=0.00$, their minimum value $d_1^{B1,A4}=\min(M_{1,0}^{B1,A4}, M_{1,1}^{B1,A4})=0.00$. Then, respectively compute sums of link metric values for path 0-0-0 and path 0-1-1 as follows: $S_0^{B1}=d_0^{A1,B1}+d_0^{B1,A4}=0.04+0.03=0.07$ and $S_1^{B1}=d_1^{A1,B1}+d_1^{B1,A4}=0.02+0.00=0.02$. Since $S_0^{B1}>S_1^{B1}$, it is determined that $S_1^{B1}$ (for path 0-1-1) is the minimal sum of link metric values among the paths as the solid-line path shown in FIG. 9D.

Step S972: Determine an optimal warping coefficient for the selected control region. As to the example given in step S970, since $S_1^{B1}$ (for path 0-1-1) is the minimal sum of link metric values among the paths, 1.02 is selected as the optimal warping coefficient of region B(1). However, if two or more paths have the same sum at the end of calculation, the warping coefficient of the node with minimum region error is selected for the selected control region. Here, the R3 number of iterations is incremented by 1.

Step S974: Determine whether the R3 number of iterations reaches a limit value of 20. If YES, the flow is terminated; otherwise, the flow goes to Step S962 for a next control region.

The compensation device 600 and the correspondence generator 65 according to the invention may be hardware, software, or a combination of hardware and software (or firmware). An example of a pure solution would be a field programmable gate array (FPGA) design or an application specific integrated circuit (ASIC) design. In a preferred embodiment, the vertex processing device 610, the primitive assemble unit 120 and an image processing apparatus 630 are implemented with a graphics processing unit (GPU) and a first program memory; the stitching decision unit 650 and the correspondence generator 65 are implemented with a general-purpose processor and a second program memory. The first program memory stores a first processor-executable program and the second program memory stores a second processor-executable program. When the first processor-executable program is executed by the GPU, the GPU is configured to function as: the vertex processing device 610, the primitive assemble unit 120 and an image processing apparatus 630. When the second processor-executable program is executed by the general-purpose processor, the general-purpose processor is configured to function as: the stitching decision unit 650 and the correspondence generator 65.

In an alternative embodiment, the compensation device 600 is implemented with a general-purpose processor and a third program memory. The third program memory stores a third processor-executable program. When the third processor-executable program is executed by the general-purpose processor, the general-purpose processor is configured to function as: the vertex processing device 610, the stitching decision unit 650, the primitive assemble unit 120, the correspondence generator 65 and an image processing apparatus 630.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method applied in an image processing system having an image capture module that captures a 360-degree horizontal field of view and 180-degree vertical field of view to generate a plurality of camera images at a time, the method comprising:
    determining warping coefficients of a plurality of control regions formed in multiple overlap regions of a panoramic image;
    for each camera image of a data structure of a target vertex from a first vertex list, retrieving two selected warping coefficients out of the warping coefficients according to two coefficient indices;
    for each camera image of the data structure of the target vertex, calculating an interpolated warping coefficient according to the two selected warping coefficients and a coefficient blending weight;
    for each camera image of the data structure of the target vertex, calculating modified texture coordinates according to the interpolated warping coefficient and original texture coordinates; and
    repeating the steps of retrieving, calculating the interpolated warping coefficient and calculating the modified texture coordinates until all the vertices from the first vertex list are processed to form a second vertex list;
    wherein each of the first vertex list and the second vertex list comprises a plurality of vertices with their data structures that define a vertex mapping between the camera images and the panoramic image;
    wherein the vertex mapping between the camera images and the panoramic image in the first vertex list is obtained by modifying coordinates between the plurality of camera images and the panoramic image for the vertices;
    wherein the coefficient blending weight for a target camera image in the data structure of the target vertex from the first vertex list is related to a first angle associated with a location of a starting control region and its original texture coordinates;
    wherein the step of determining the warping coefficients further comprises:
        setting warping coefficients of the control regions in a predefined range according to an offset of the image capture module that its real focal point of the image capture module is separated from its optimal focal point;
        forming a 2-D error table comprising the warping coefficients and their corresponding region errors with respect to the control regions, wherein the warping coefficients and their corresponding region errors are arranged in order in the 2-D error table; and
        determining an optimal warping coefficient for each control region; and
    wherein the step of determining the optimal warping coefficient further comprises:
    (a) fetching a decision group from the 2D error table, wherein the decision group comprises a target control region and a plurality of neighboring control regions;
    (b) determining one or more local minimums among the region errors of each control region in the decision group;
    (c) defining the one or more local minimums with one or more corresponding warping coefficient as one or more candidates for each control region in the decision group;
    (d) determining an optimal warping coefficient among the one or more candidates for the target control region such that the optimal warping coefficient is the closet to the warping coefficients of the candidates of its neighboring control regions; and
    (e) repeating steps (a) to (d) until the optimal warping coefficients of all control regions are determined based on local minimums among region errors for each control region.

2. The method according to claim 1, wherein the control regions comprise a plurality of edge control regions and a plurality of corner control regions and the number of control regions is greater than the number of the overlap regions.

3. The method according to claim 1, further comprising:
    generating the panoramic image by an image processing apparatus of the image processing system according to the second vertex list and the plurality of camera images in a rendering mode.

4. The method according to claim 1, further comprising:
    measuring region errors of the control regions by an image processing apparatus of the image processing system according to the second vertex list and the plurality of camera images in a measure mode.

5. The method according to claim 4, wherein the step of determining further comprises:
   determining the warping coefficients of the control regions according to the region errors region errors of the control regions.

6. The method according to claim 1, wherein the original texture coordinates of the target vertex in the first vertex list is located between a first control region and a second control region in a specified camera image, and wherein the first control region has a first selected warping coefficient out of the two selected warping coefficients and the second control region has a second selected warping coefficient out of the two selected warping coefficients.

7. The method according to claim 6, wherein the coefficient blending weight in the specified camera image for the data structure of the target vertex from the first vertex list is associated with a second angle between a first vector from the center of the specified camera image to the location of the first control region and a second vector from the center of the specified camera image to the target vertex, and wherein the second angle is a part of the first angle.

8. The method according to claim 6, wherein the coefficient blending weight in the specified camera image for the data structure of the target vertex from the first vertex list is further associated with a number of control regions located in the specified camera image.

9. The method according to claim 7, wherein the step of calculating the interpolated warping coefficient further comprises:
   calculating the interpolated warping coefficient in the specified camera image for the target vertex according to the following equation: $C'=C2*a+C1*(1-a)$; and
   wherein $C'$ denotes the interpolated warping coefficient, $C1$ denotes the first selected warping coefficient, $C2$ denotes the second selected warping coefficient, and $a$ denotes the coefficient blending weight for the specified camera image.

10. The method according to claim 1, wherein the step of calculating the modified texture coordinates coordination further comprises:
   calculating the modified texture coordinates in a specified camera image for the target vertex according to the following equation:
   $$u0'=(u0-u_{center})*C'+u_{center};\ v0'=(v0-v_{center})*C'+v_{center};$$
   wherein $(u0', v0')$ denotes the modified texture coordinates of the target vertex, $(u0, v0)$ denotes the original texture coordinates of the target vertex, $C'$ denotes the interpolated warping coefficient, and $(u_{center}, v_{center})$ denotes texture coordinates of the center of the specified camera image.

* * * * *